(12) United States Patent
Baek et al.

(10) Patent No.: US 9,746,939 B2
(45) Date of Patent: Aug. 29, 2017

(54) MOBILE TERMINAL AND METHOD FOR CONTROLLING THE SAME

(71) Applicant: LG Electronics Inc., Seoul (KR)

(72) Inventors: Sungmin Baek, Seoul (KR); Soungmin Im, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 241 days.

(21) Appl. No.: 14/471,843

(22) Filed: Aug. 28, 2014

(65) Prior Publication Data

US 2015/0199031 A1    Jul. 16, 2015

(30) Foreign Application Priority Data

Jan. 13, 2014    (KR) .................. 10-2014-0004217

(51) Int. Cl.

| | |
|---|---|
| *G06F 3/03* | (2006.01) |
| *G06F 3/042* | (2006.01) |
| *G06F 3/0483* | (2013.01) |
| *H04N 1/195* | (2006.01) |
| *G06F 3/0488* | (2013.01) |
| *G06F 3/01* | (2006.01) |
| *G06K 9/20* | (2006.01) |
| *G06K 9/22* | (2006.01) |

(52) U.S. Cl.
CPC ............ *G06F 3/0304* (2013.01); *G06F 3/017* (2013.01); *G06F 3/0425* (2013.01); *G06F 3/0483* (2013.01); *G06F 3/04883* (2013.01); *G06K 9/2081* (2013.01); *G06K 9/22* (2013.01); *H04N 1/19594* (2013.01)

(58) Field of Classification Search
CPC .... G06F 3/017; G06F 3/0304; G06F 3/04883; G06F 3/0483; G06F 3/0425; H04N 1/19594; G06K 9/22

See application file for complete search history.

(56) References Cited

U.S. PATENT DOCUMENTS

| | | | |
|---|---|---|---|
| 2003/0103238 A1 | 6/2003 | MacLean et al. | |
| 2004/0179001 A1* | 9/2004 | Morrison ............ | G06F 3/03545 345/179 |
| 2007/0025612 A1* | 2/2007 | Iwasaki .................. | G01B 11/25 382/154 |
| 2008/0018591 A1* | 1/2008 | Pittel ..................... | G06F 1/1616 345/156 |

(Continued)

FOREIGN PATENT DOCUMENTS

| | | | | |
|---|---|---|---|---|
| EP | 0622722 A2 | 11/1994 | | |
| JP | 02003291399 A | * 10/2003 | .............. | B41J 2/415 |

(Continued)

*Primary Examiner* — Abbas Abdulselam
(74) *Attorney, Agent, or Firm* — Birch, Stewart, Kolasch & Birch, LLP

(57) ABSTRACT

A mobile terminal including a projector configured to project image information; a capturing unit configured to recognize a writing motion on a paper medium and a writing of a specific symbol in an area selected by the writing motion; and a controller configured to execute a control command for the specific symbol in the selected area if the specific symbol matches a preset symbol, and control the projector to project image information corresponding to a result of the execution of the control command on the area with the written specific symbol.

18 Claims, 19 Drawing Sheets

(56) References Cited

U.S. PATENT DOCUMENTS

| | | | |
|---|---|---|---|
| 2008/0107270 A1* | 5/2008 | Ikegami | H04N 7/1675 380/277 |
| 2010/0179390 A1* | 7/2010 | Davis | G06F 19/3418 600/301 |
| 2011/0058109 A1* | 3/2011 | Nishigaki | G06F 3/0425 348/744 |
| 2011/0130159 A1* | 6/2011 | Chen | G06F 3/0317 455/466 |
| 2011/0304833 A1* | 12/2011 | Osaka | G03B 21/00 353/85 |
| 2012/0042288 A1 | 2/2012 | Liao et al. | |
| 2012/0320092 A1 | 12/2012 | Shin et al. | |
| 2013/0229333 A1* | 9/2013 | Schwartz | G06F 1/3231 345/156 |
| 2013/0321356 A1* | 12/2013 | Al-Sharif | G06F 3/03545 345/179 |
| 2014/0015861 A1* | 1/2014 | Takemoto | G06T 11/60 345/641 |
| 2014/0108993 A1* | 4/2014 | Zhai | G06F 3/0489 715/773 |

FOREIGN PATENT DOCUMENTS

| | | | | |
|---|---|---|---|---|
| JP | 02013171490 A | * | 9/2013 | G06F 3/041 |
| WO | WO 2006/036853 A2 | | 4/2009 | |

* cited by examiner

FIG. 3D
(a)
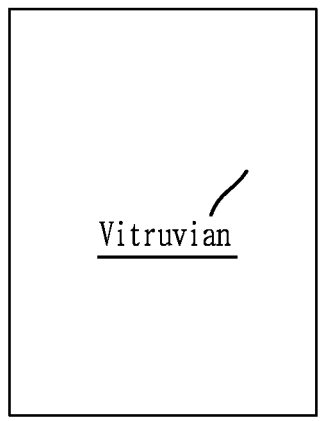
(b)
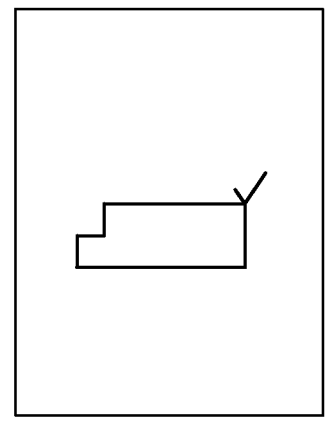
(c)
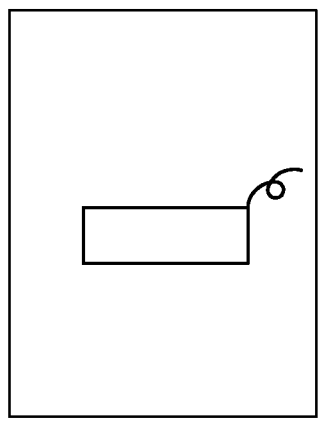
(d)
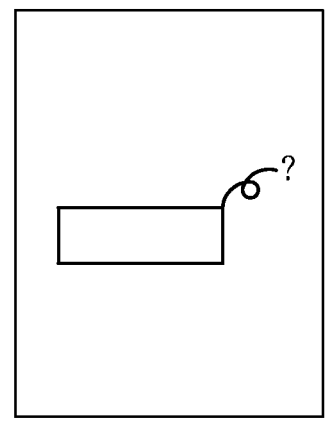

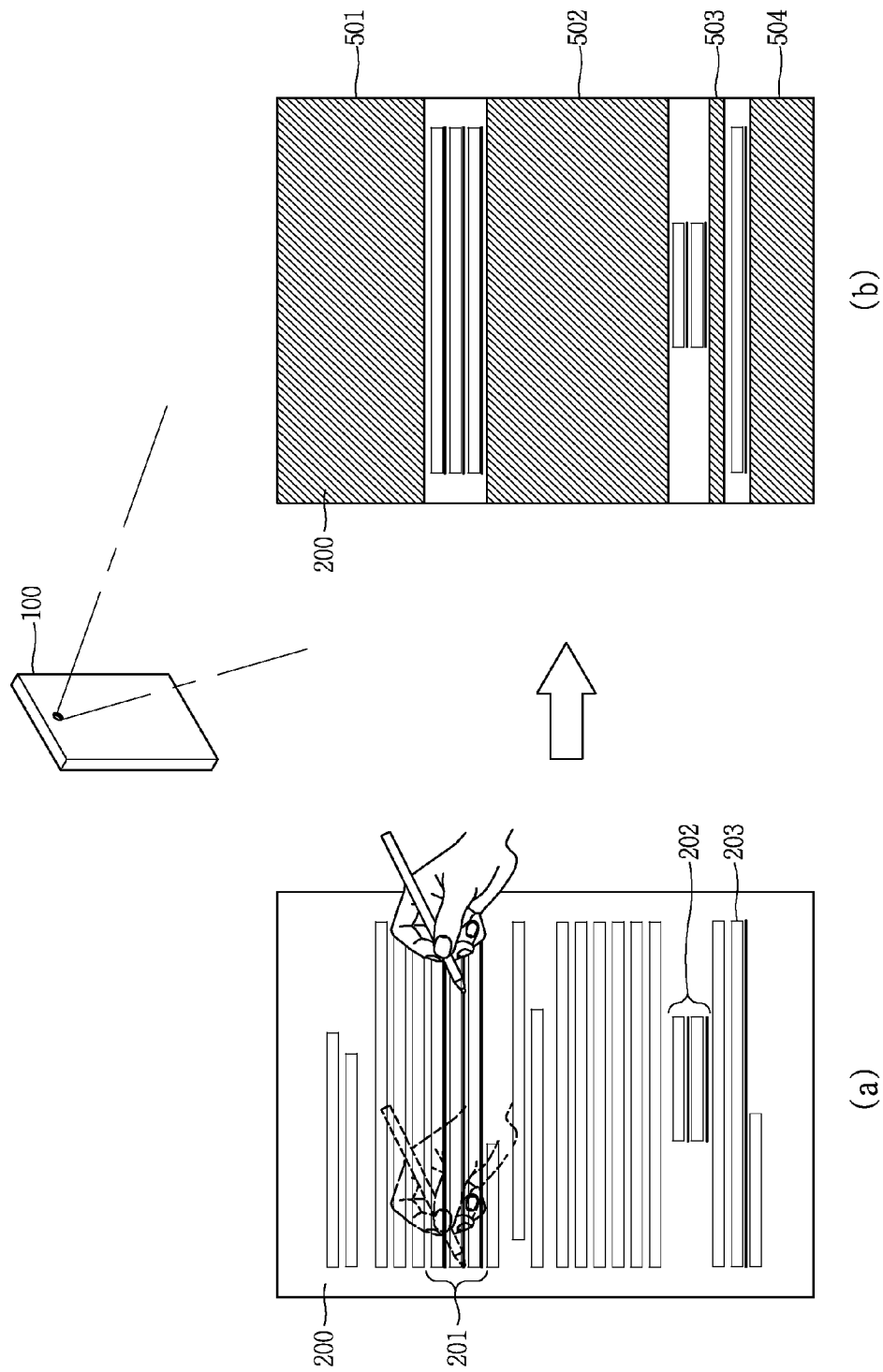

MOBILE TERMINAL AND METHOD FOR CONTROLLING THE SAME

CROSS-REFERENCE TO A RELATED APPLICATION

Pursuant to 35 U.S.C. §119(a), this application claims the benefit of earlier filing date and right of priority to Korean Application No. 10-2014-0004217, filed on Jan. 13, 2014, the contents of which is incorporated by reference herein in its entirety.

BACKGROUND OF THE INVENTION

1. Field of the Invention

The present invention relates to a mobile terminal capable of projecting image information and a method of controlling the same.

2. Background of the Invention

Terminals may be generally classified as mobile/portable terminals or stationary terminals. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components. With such improvement, terminals are evolving with various types of designs. For example, many users still enjoy reading paperback books even though they can read various content on their mobile terminals. However, when a user wants to search for specific information while reading paperback books, they need to do a search on their mobile terminal, which decreases the user's focus.

SUMMARY OF THE INVENTION

Therefore, an aspect of the present invention is to provide a mobile terminal which is configured to recognize a user's writing on an object-medium, especially, a paper medium, and provide related information to the paper medium the user is seeing, and a method of controlling the same.

Another aspect of the present invention is to provide a mobile terminal which is capable of interacting with a paper medium by entering a control command on the paper medium to execute a specific function and outputting a result of entering the control command to the paper medium, and a method of controlling the same.

To achieve these and other advantages and in accordance with the purpose of this specification, as embodied and broadly described herein, there is provided a mobile terminal including: a main body; a projector that is placed on the main body and projects image information; a capturing unit that recognizes a writing motion on a paper medium and the writing of a specific symbol in an area selected by the writing motion; and a controller that executes a control command for the specific symbol in the selected area if the specific symbol matches a preset symbol and controls the projector to project image information corresponding to the execution result on the area with the specific symbol written thereon.

The controller may control the capturing unit to recognize the location of the selected area and the text included in the selected area.

If the control command corresponding to the specific symbol is to execute a search function, the controller may execute a search function using the recognized text as a keyword and project image information corresponding to the search result.

If the control command corresponding to the specific symbol is to execute an alignment function, the controller may align the text included in the selected area in order of a number corresponding to the specific symbol and project image information corresponding to the aligned text.

The capturing unit may recognize the color produced by a writing tool used to make the writing motion, and the controller may align the text included in the selected area by color according to the ordinal number of the specific symbol, based on the recognized color of the writing tool, and project image information corresponding to the aligned text.

The capturing unit may recognize the width of a touch path drawn by the writing motion, and if the recognized width of the touch path exceeds a reference value, the controller may control the projector in a way that shows an intended highlighting effect on the selected area.

The capturing unit may recognize a preset pattern of touch on a line drawn by the writing motion, and upon recognizing the preset pattern of touch, the controller may deselect the area corresponding to the writing motion along the touch path.

If the control command corresponding to the specific symbol is to execute a tagging function, the controller may hash the context of a specific phrase in the area selected by the writing motion and create a tag unique to the specific phrase.

The controller may receive information related to the specific phrase from a connected SNS server, in response to a touch on the area with the tagged specific phrase thereon, and project the received information on the area associated with the location where the specific phrase is written.

The capturing unit may recognize a touch path drawn on the paper medium by the writing motion, and the controller may determine the priority of projection of image information corresponding to the selected area, based on the recognized touch path.

The controller may increase the priority of projection of image information as the width of the touch path increases, and if the multiple image information overlaps at least partially with each other, the controller may enable higher-priority image information to be projected on a higher level.

The controller may project image information corresponding to the execution result on the outside of the selected area next to the specific symbol.

The controller may recognize empty space on the paper medium where text, writings, or specific symbols are not written by using the capturing unit, and control the projector to project image information corresponding to the execution result on the empty space.

The controller may recognize the background color of an area where image information corresponding to the execution result is to be projected by using the capturing unit, and control the projector so that the image information is projected in a color which is visually distinct from the background color.

A dog-ear icon may be displayed in one area of the image information, and the controller may reduce the projection range of image information to a preset level, in response to a touch on the dog-ear icon through the capturing unit.

In response to a drag on a touch on one area where the image information is projected, the controller may control the projector so that the projection position of the image information moves along the drag.

Upon recognizing, through the capturing unit, that a page of the paper medium is turned over, the controller may store the projection position of the image information relative to the selected area on the paper medium and the content contained in the projected image information in the memory and then initialize the projection.

Upon sensing the presence of the specific symbol from a new page that appears after turning over a page of the paper medium, by using the capturing unit, the controller may detect image information corresponding to the page with the specific symbol thereon from the memory and project the detected image information immediately on the area with the specific symbol written thereon.

If the specific symbol and the preset symbol fail to match each other, the controller may control the projector to project a stored message indicating a matching failure on the area with the specific symbol written thereon.

According to an embodiment of the present invention, there is provided a method of controlling a mobile terminal, the method including the steps of: recognizing a writing motion on a paper medium and the writing of a specific symbol in an area selected by the writing motion by using a camera; matching the recognized specific symbol against preset symbols; and executing a control command for the specific symbol in the selected area if the specific symbol matches a preset symbol.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

In the drawings:

FIGS. 3A to 3E are conceptual diagrams illustrating a method of projecting image information on a paper medium according to an embodiment of the present invention;

FIG. 5 is a conceptual diagram illustrating a method of projecting image information in a way that shows a highlighting effect on an area selected on the paper medium;

DETAILED DESCRIPTION OF THE INVENTION

Description will now be given in detail according to embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
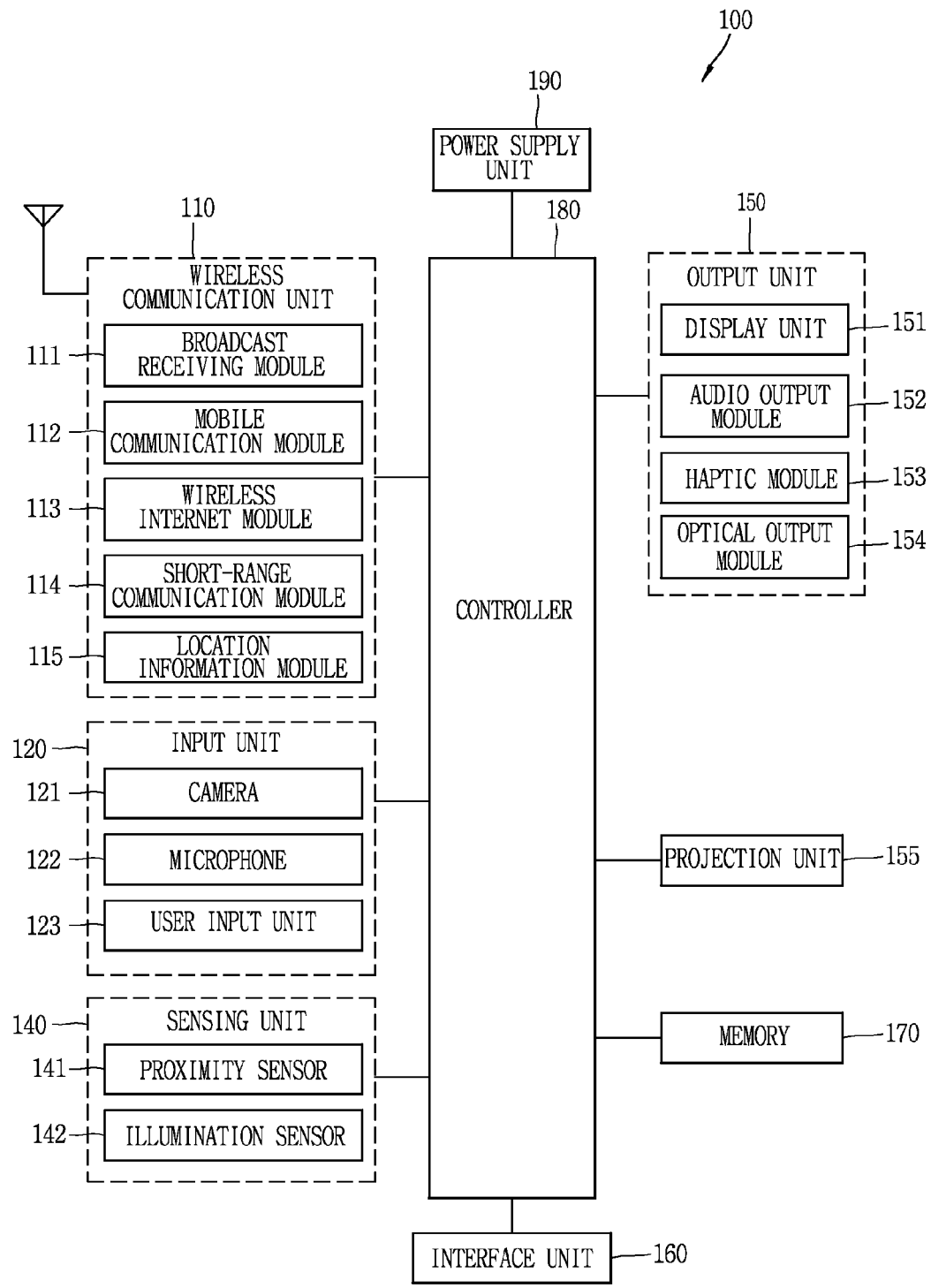
FIG. 1A is a block diagram illustrating a mobile terminal according to an embodiment of the present invention.
Figure 1B:
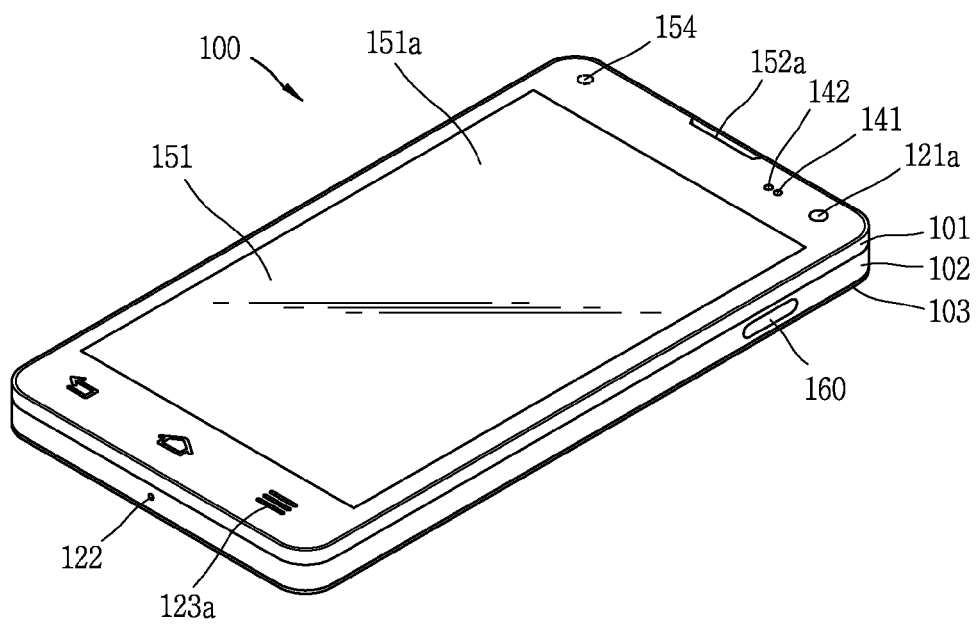
FIGS. 1B and 1C are conceptual diagrams of an example of the mobile terminal according to an embodiment of the present invention when viewed from different directions.
Figure 1C:
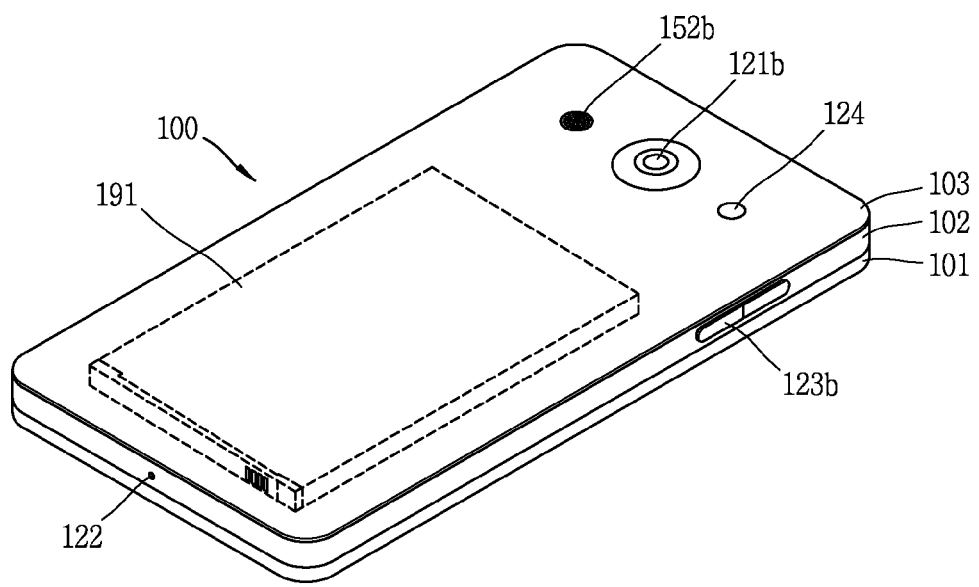

FIG. 1A is a block diagram illustrating a mobile terminal 100 according to an embodiment of the present invention, and FIGS. 1B and 1C are conceptual views of one example of the mobile terminal viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. All of the illustrated components of FIG. 1A is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 3A, or activating application programs stored in the memory 170. As one example, the controller 180 controls some or all of the components according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100.

The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

A projector 155 may be placed anywhere on the mobile terminal 100. The projector 155 includes a light source element, an image forming module, and a lens, and is configured to project image information. The light source element emits light, and the image forming module forms image information (or screen information) with light. The lens magnifies and projects image information, and may be placed corresponding to a projection hole. The projector 155 is also referred to as a beam projector.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations.

Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant invention. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable mobile terminals. Examples of such suitable mobile terminals include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two mobile terminals, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1). Therefore, the touch screen may replace at least some of the functions of the first manipulation unit 123a.

The first audio output module 152a may be implemented in the form of a speaker to output voice audio, alarm sounds, multimedia audio reproduction, and the like. The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, a communication system which is operable with the mobile terminal 100 according to one embodiment of the present invention will be described. Such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system. A CDMA wireless communication system is shown having a plurality of mobile terminals 100, a plurality of base stations (BSs), base station controllers (BSCs), and a mobile switching center (MSC). The MSC is configured to interface with a conventional Public Switch Telephone Network (PSTN). The MSC is also configured to interface with the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 (FIG. 1A) is typically configured inside the mobile terminal 100 to receive broadcast signals transmitted by the BT.

Several Global Positioning System (GPS) satellites may be provided. Such satellites 300 facilitate locating the position of at least one of plural mobile terminals 100. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

The mobile terminal 100 according to the embodiment of the present invention including at least one of the above-explained components includes a capturing unit 121 (which may be hereinafter referred to as 'camera') for recognizing a writing motion on a paper medium and specific symbols and a projector 155 for projecting image information.

The controller 180 of the mobile terminal 100 matches a specific symbol recognized by the capturing unit 121 against preset symbols. If the specific symbol matches a preset symbol, the controller 180 executes a control command for the specific symbol in an area selected by the writing motion on the paper medium. For example, if the control command for the specific symbol is 'execute capture function', the controller 180 can execute 'capture function' in the selected area. Using the projector 155, the controller 180 projects the execution result of the control command for the specific symbol, i.e., a captured image, on the area with the specific symbol written on it.

As such, the mobile terminal 100 according to the embodiment of the present invention provides an interface environment where it can interact with a paper medium by recognizing a user's writing on the paper medium and presenting writing-related information on the paper medium.

The mobile terminal 100 according to the embodiment of the present invention can be implemented in the form of a device with no display or in the form of a glass-type device, watch-type device, etc. that are wearable on the user's specific body part (e.g., head, wrist, ears, shoulder, neck, and clothing), as explained above. Hereinafter, embodiments related to a control method that can be implemented in the mobile terminal with the above configuration will be discussed with reference to the accompanying drawings.

Figure 2:
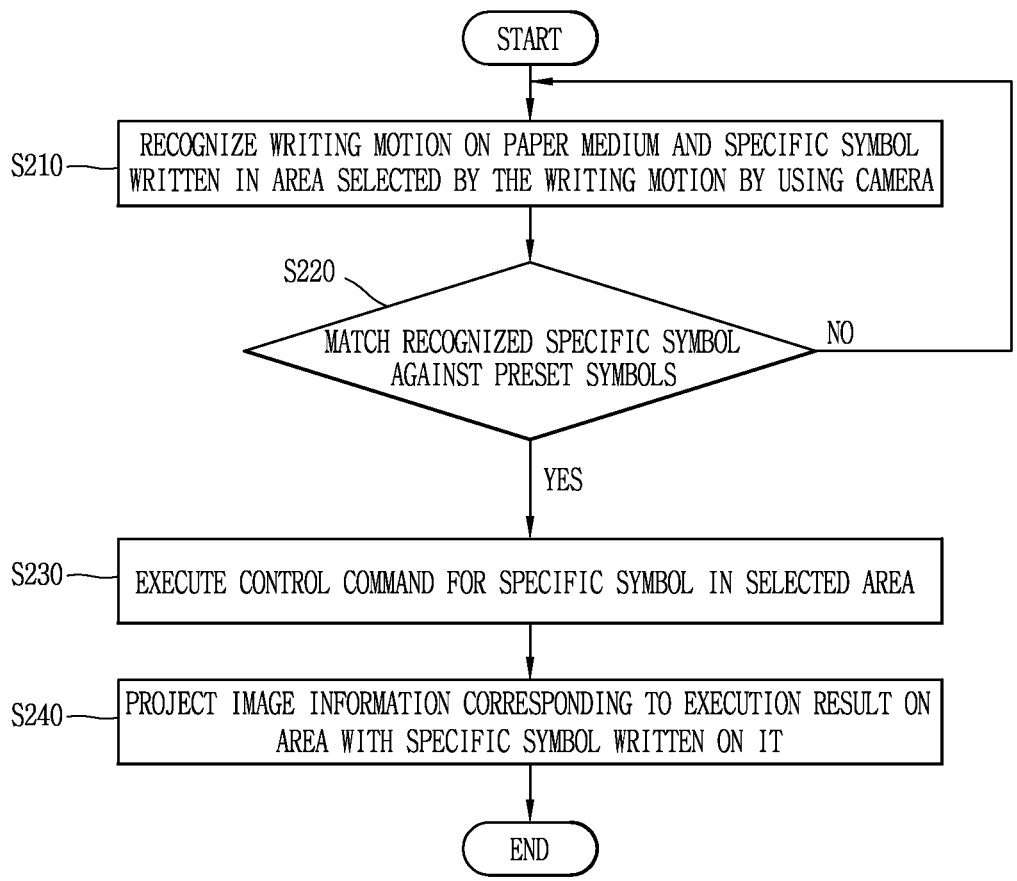
FIG. 2 is a flowchart illustrating a method of controlling a mobile terminal according to an embodiment of the present invention.

FIG. 2 is a flowchart illustrating a method of controlling a mobile terminal according to an embodiment of the present invention, and FIGS. 3A to 3E are conceptual diagrams illustrating a method of projecting image information on a paper medium according to an embodiment of the present invention.

First, in the method of controlling a mobile terminal 100 according to the embodiment of the present invention, a writing motion on a paper medium and a specific symbol written in an area selected by the writing motion are recognized by the capturing unit 121 placed on one side of the mobile terminal 100 (S210).

Herein, the paper medium, a medium made from paper, which contrasts with an electronic medium, embraces a single page with text on it, newspaper, a paper book, a paper magazine, etc. Although the present invention is described taking paper as an example, the embodiments of the present invention can recognize writing on an object-medium, such as a blackboard, wall, etc., made from other material where the user can write.

The capturing unit 121 is activated by an activation signal from the controller 180, and continuously captures in order to recognize the location of the paper medium and lines, characters, etc. written by a writing motion. In order for the capturing unit 121 to continuously monitor writing motion on a paper medium, the paper medium should be within the angle of view of the capturing unit 121. If at least part of the paper medium is out of the angle of view of the capturing unit 121, the controller 180 can output a message for guiding the paper medium to be within the angle of view of the capturing unit 121.

The writing motion on the paper medium may be made with a writing tool or by a hand touch from the user. For example, the user can make a writing motion by underlining areas of interest or content with a writing tool while reading the paper medium. The capturing unit 121 may recognize that a specific word, phrase, or area printed on the paper medium is selected with a writing tool or by the user's touch.

Examples will now be given to select a specific word, phrase, or area. When the capturing unit 121 senses a writing motion, such as underlining a specific word, phrase, or area or drawing a closed loop, the controller 180 recognizes that this word, phrase, or area is selected. After selecting a specific word, phrase, or area, the capturing unit 121 then monitors if a specific symbol is being written in the selected area.

The specific symbol may be the input of a control command for performing a specific function equipped in the mobile terminal. Specifically, the capturing unit 121 monitors if a specific symbols is being written by a writing motion on the paper medium. Then, the controller 180 recognizes that the specific symbol is identical to a preset symbol, and executes a control command for performing a specific function matching the preset symbol. Accordingly, the user can get a desired, specific function to run on the mobile terminal 100 while keeping their eyes on the paper medium, thereby offering an environment where the paper medium and the mobile terminal 100 can interact with each other.

Next, the controller 180 of the mobile terminal 100 determines if the recognized specific symbol matches against preset symbols (S220). In more detail, the controller 180 receives information related to the writing of the specific symbol from the capturing unit 121. Specifically, the controller 180 analyzes an image received from the capturing unit 121, and acquires information on the order in which each stroke of the specific symbol is written, the location on the paper medium where the specific symbol is written, and the order in which a plurality of specific symbols are written. Based on the acquired information, the controller 180 compares the specific symbol with symbols preset on the mobile terminal 100 if any of these symbols matches the specific symbol.

If the comparison result shows that the specific symbol matches a preset symbol (Yes in S220), the controller 180 executes a control command for the specific symbol in the selected area (S230). From the selected area recognized by the capturing unit 121, the controller 180 recognizes the location of the selected area and the text included in the selected area.

The types and shapes of preset symbols against which the specific symbol is matched may be implemented in various ways. More preferably, the preset symbols may be easily associated with the corresponding control commands. For example, the preset symbols may include special characters such as #, ※, √, ?, <, >, or ~, figures, mathematical symbols, alphabet letters, consonants, vowels, and user-defined characters. Further, the preset symbols may include proofreader's marks indicating Insert space, Remove Space, Delete, Change paragraph, Paragraph need not change, Insert, Word replacement, Left-justified alignment, Right justified alignment, etc. Further, the preset symbols may include complex symbols, each consisting of a plurality of symbols, as well as single symbols.

Regarding this, as shown in (a) of FIG. 3D, if the user writes an outward-directed line symbol next to the word "Vitruvian" selected by underlining it on the paper medium, the controller 180 can recognize that this line signal corresponds to a control command for executing 'dictionary search' function. Moreover, as shown in (b) of FIG. 3D, if the user writes a check symbol next to a selected specific area by drawing a closed loop on the paper medium, the controller 180 can recognize that the check symbol corresponds to a control command for executing 'capture and save' function. In addition, the symbol '!' shown in (c) of FIG. 3D and the symbol '?' shown in (d) of FIG. 3D may be recognized as symbols for control commands for executing 'SNS search' function and 'internet search' function, respectively, in a selected area.

Further, the preset symbols against which the specific symbol is matched may include symbols for presenting a guidance message to inform the user of operations corresponding to the types of symbols for specific control commands. In this instance, the user does not need to select a specific area on the paper medium. Additionally, it is possible to add a new symbol for a new control command, or change, delete, and combine preset symbols, or replace a control command for a preset signal by other control commands, by the input unit 130 of the controller 180.

Next, the controller 180 generates image information corresponding to the execution result of a control command and controls the projector 155 to project the generated image information on the area with the specific symbol written on it (S240). As described above, the projector 155 may include a light source element, an image forming module, and a lens. The light source element emits light, and the image forming module forms image information (or screen information) with light.

In the embodiments of the present invention, the projector 155 may further include a laser diode. In particular, the laser diode may be a red laser diode. The projector 155 may include a plurality of projection mechanisms. In this instance, the plurality of projection mechanisms each may output different image information.

The controller 180 projects image information corresponding to the execution result of a control command on the area with the specific symbol written on it. For visibility, the area with the specific symbol written on it is on the outside of the selected area next to the specific symbol. This is because, when image information is projected on the selected area, it is difficult for the user to easily recognize the text included in the selected area or the text included in the image information.

Specifically, if the control command corresponding to the specific symbol is to execute a search function, the controller 180 can execute a search function using the recognized text as a keyword and project image information corresponding to the search result toward the paper medium through the projector 155.

Figure 3A:
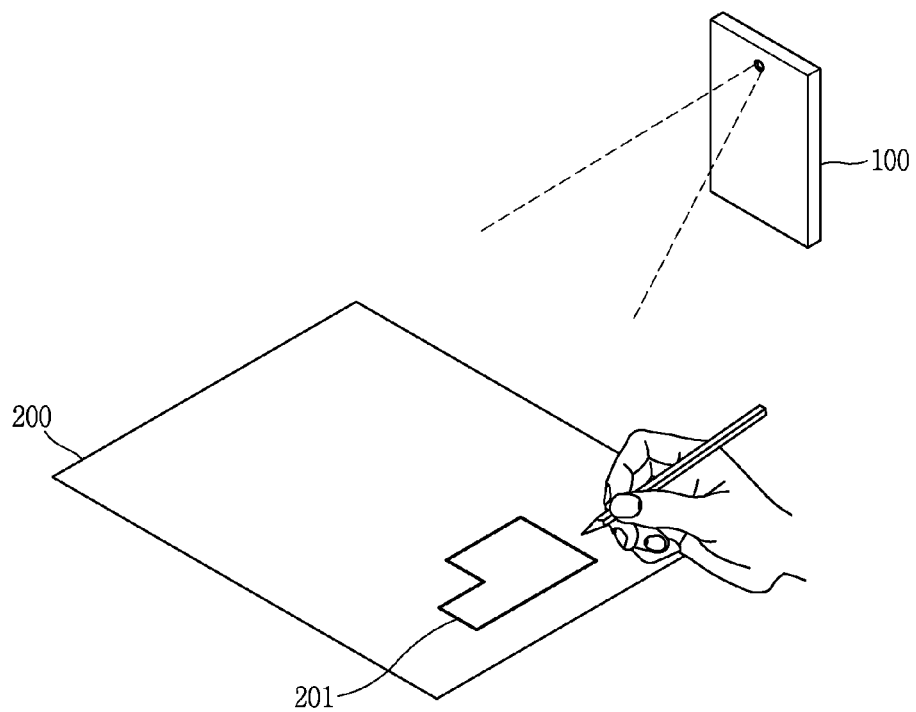
Figure 3B:
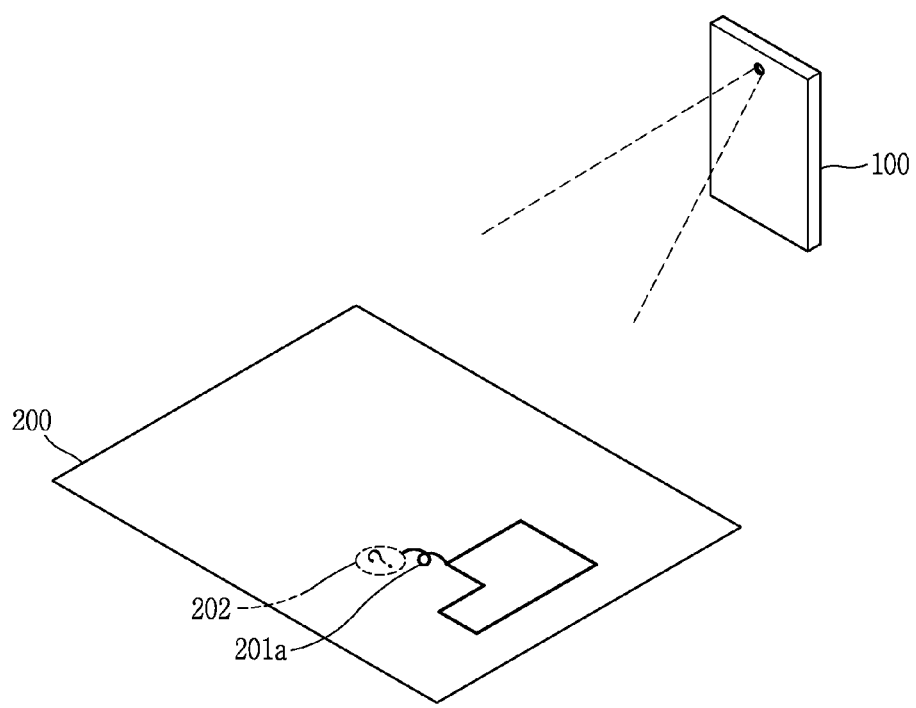
Figure 3C:
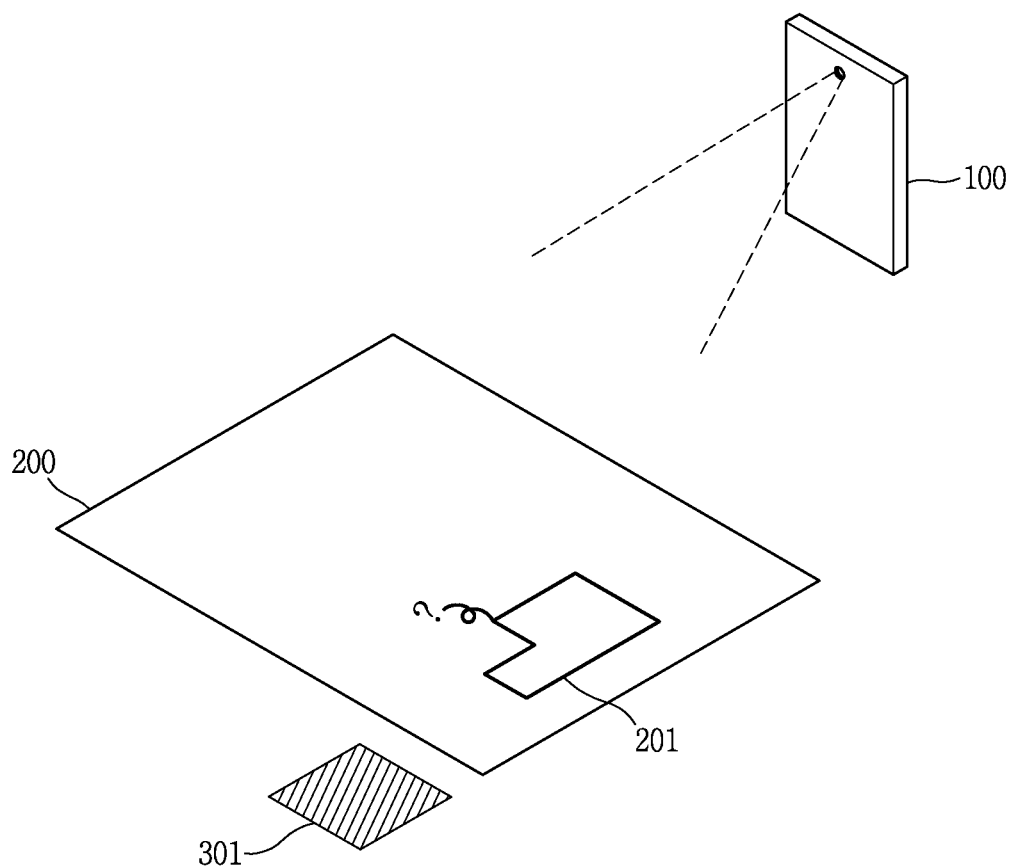

For example, referring to FIGS. 3A to 3C, while the mobile terminal 100 is monitoring writing motion on the paper medium, if the user makes a writing motion to select a specific area 201 on the paper medium 200 as shown in FIG. 3A, and adds a line 201a to the selected area and then writes the symbol '?' 202 as shown in FIG. 3B, the mobile terminal recognizes the characters included in the selected area and executes 'Internet search function' corresponding to the symbol '?'. Then, image information 301 corresponding to the execution result of 'Internet search function' is projected on the location where the symbol '?' is written, i.e., the outer side of the paper medium 200 for this case.

Figure 3E:
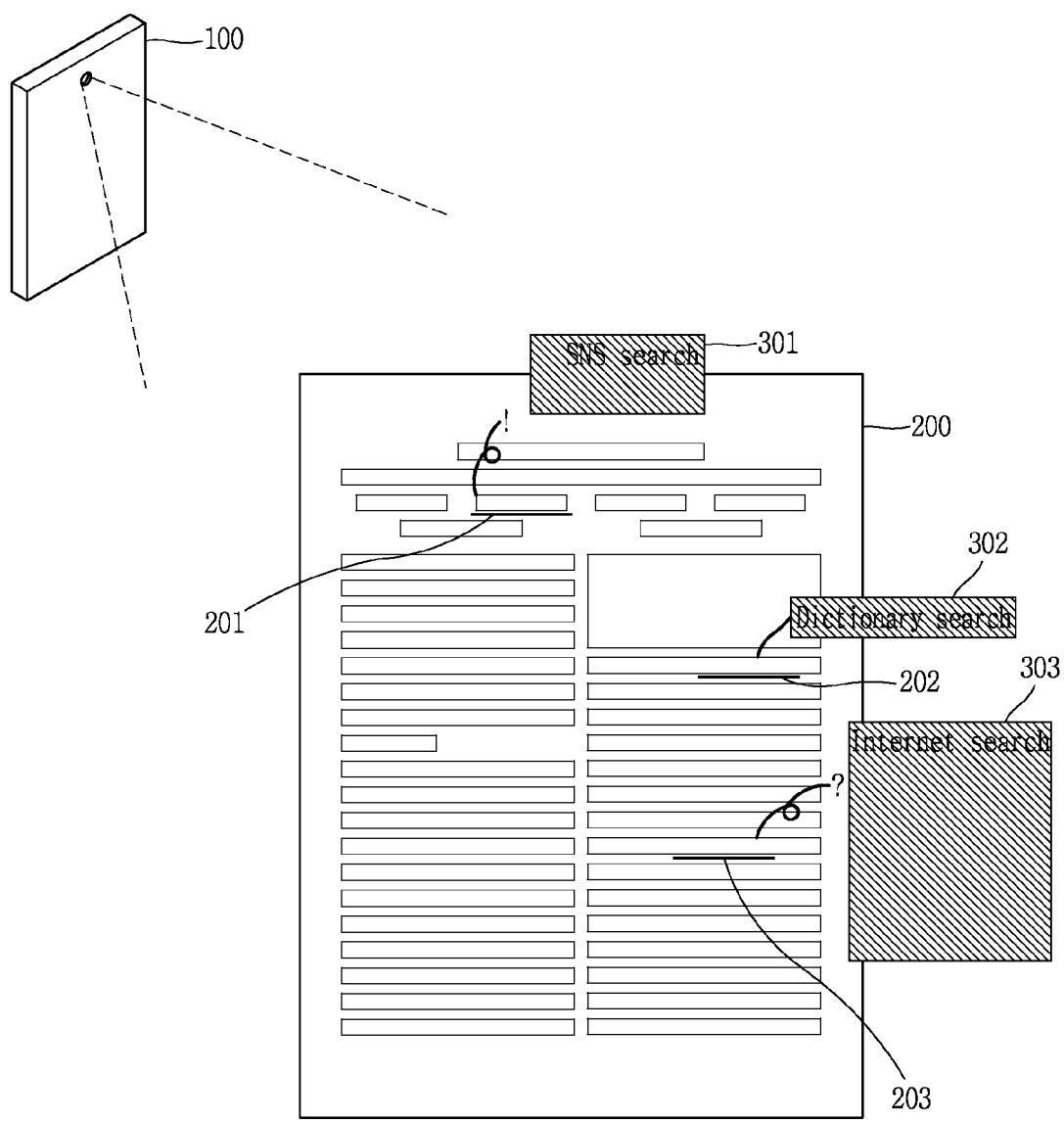

In another example, FIG. 3E shows various examples in which the mobile terminal 100 recognizes a specific symbol written on the paper medium 200 and projects image information corresponding to the execution result of a control command for the written specific symbol onto the paper medium. As illustrated therein, an SNS search result 301 for a selected area 201 is projected next to the symbol '!' written on the paper medium, a dictionary search result 302 is projected next to the line symbol added to the selected area 202, and an internet search result 303 is projected next to the symbol '?' added to the selected area 203. The projection range of each image information may be determined by the amount of information included in each result and the user's settings. Moreover, each image information may be projected on the outer side of the paper medium so as to avoid obstructing the visibility of text written on the paper medium.

In addition, a specific symbol recognized by the capturing unit 121 will have to remain written while image information is being projected on the paper medium. Further, when the capturing unit 121 senses that a specific symbol written on the paper medium has disappeared, the controller 180 can stop projecting the corresponding image information.

If the comparison result shows that a specific symbol does not match any preset symbol (No in S220), the controller 180 can project a stored message indicating a matching failure on the area with the specific symbol written on it.

As explained above, the mobile terminal 100 according to the embodiment of the present invention provides an interface environment where it can interact with a paper medium by recognizing a user's writing on the paper medium and presenting writing-related information on the paper medium.

Hereinafter, examples of projecting the execution results of various functions on a selected area based on a specific symbol written on the paper medium will be described more concretely. In particular, FIGS. 4A and 4B are conceptual diagrams illustrating a method of projecting the execution result of an alignment function for a selected area on a paper medium according to an embodiment of the present invention.

The capturing unit 121 placed on one side of the mobile terminal 100 recognizes a writing motion on a paper medium and the writing of a specific symbol in an area selected by the writing motion. If the result of matching the specific symbol against symbols preset on the mobile terminal 100 shows that the control command corresponding to the written specific symbol is to execute an alignment function, the controller 180 aligns the text included in the selected area in order of a number corresponding to the specific symbol. Next, the controller projects image information corresponding to the aligned text on the area with the specific symbol written on it, through the projector 155.

Figure 4A:
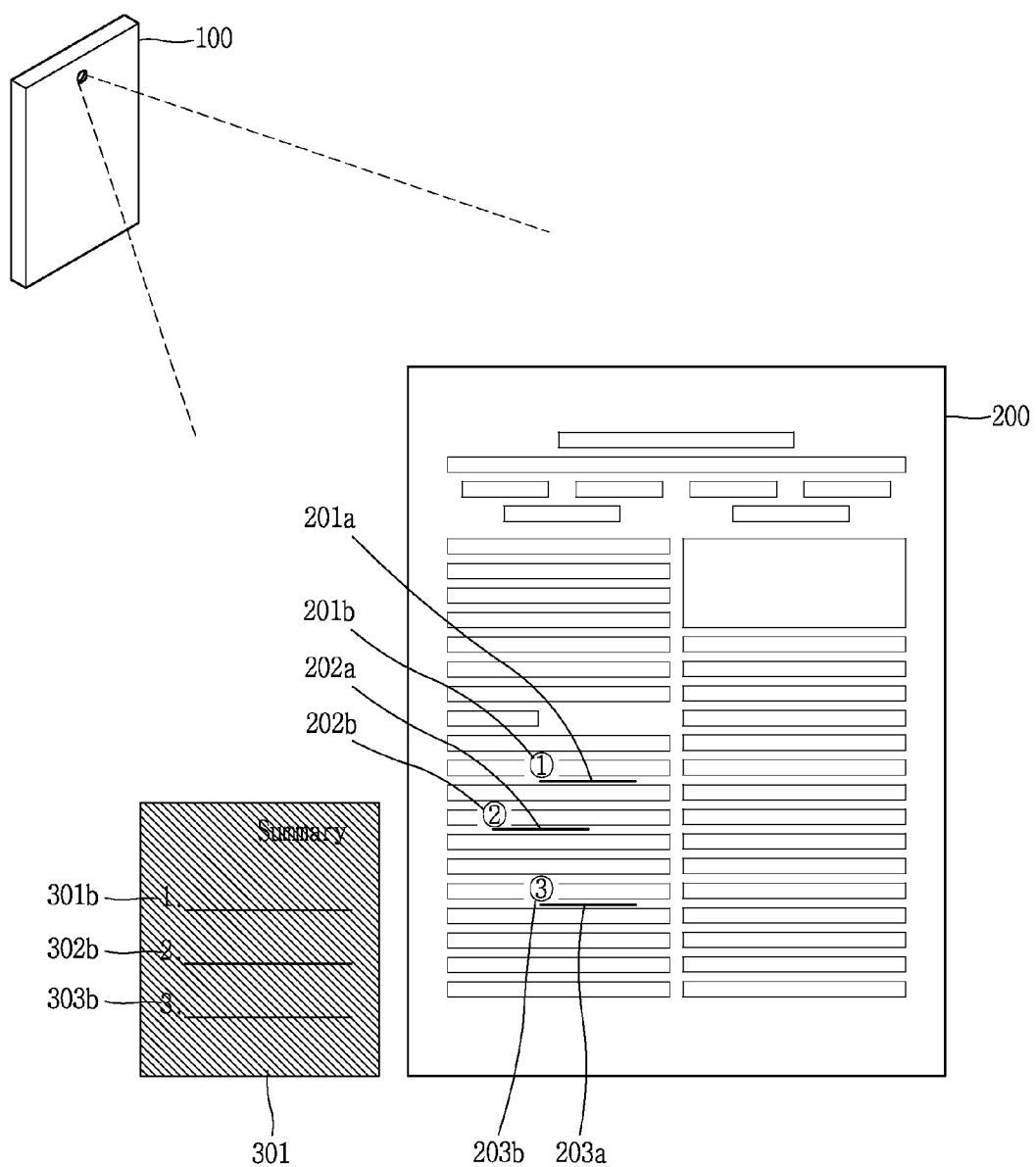
FIGS. 4A and 4B are conceptual diagrams illustrating a method of projecting the execution result of an alignment function for a selected area on a paper medium according to an embodiment of the present invention.
Figure 4B:
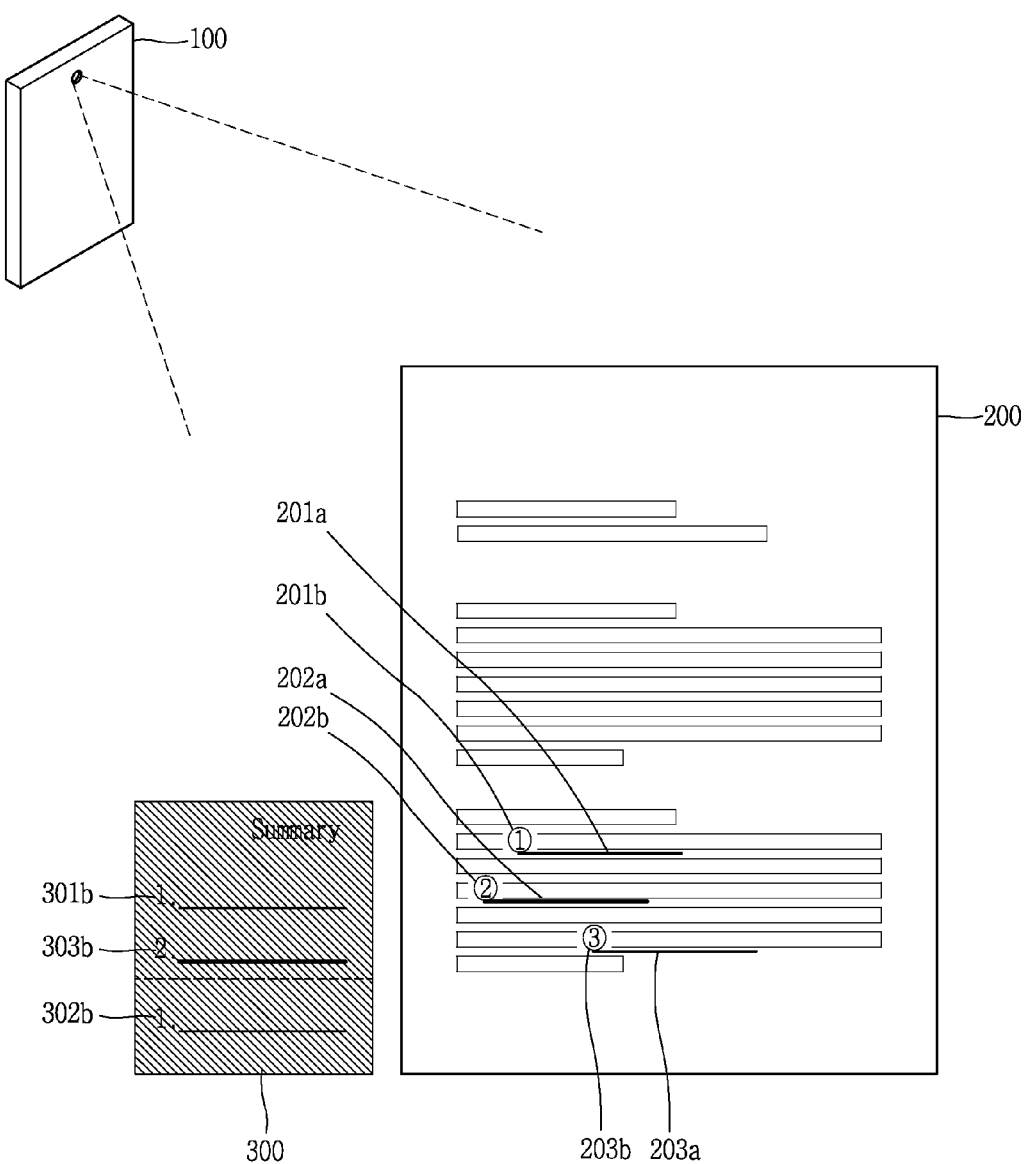

For example, referring to FIG. 4A, the mobile terminal 100 monitors writing motion on the paper medium through the capturing unit 121. By doing so, the mobile terminal 100 can recognize that the user underlines a plurality of specific phrases on the paper medium 200 to specify selected areas 201a, 202a, and 203a and writes specific symbols, i.e., numerical symbols 201b, 202b, and 203b in the selected areas. Then, the mobile terminal 100 aligns the text included in the selected areas 201a, 202a, and 203a according to the order of the numerical symbols, and projects aligned image information onto the area where the numerical symbols 201b, 202b, and 203b are located. Accordingly, the user can view at a glance summaries 301b, 302b, and 303b of the parts the user finds and marks important on the paper medium, in the order corresponding to the numerical symbols 201b, 202b, and 203b.

The capturing unit 121 may recognize the color produced by a writing tool used to make a writing motion on the paper medium and/or the width of a touch path. Specifically, the controller 180 can recognize the color produced by a writing tool used to make a writing motion on the paper medium, the width of a touch path, etc. by analyzing the image information acquired through the capturing unit 121.

Upon recognizing the color produced by a writing tool used to make a writing motion and the width of a touch path, the controller 180 can align the text included in a selected area by color or by writing tool according to the ordinal number of the specific symbol.

For example, referring to FIG. 4B, if the user underlines specific phrases on the paper medium 200 and specifies selected areas 201a, 202a, and 203a with different types of writing tools, the capturing unit 121 of the mobile terminal 100 recognizes that the first area 201a and the third area 203a are selected with the same color writing tool and the second area 202a is selected with a different color of writing tool.

Next, when generating aligned image information 301, the controller 180 aligns (301b and 303b) the text included in the first and second areas 201a and 203a selected in a first color according to the order corresponding to the numerical symbols 201b and 203b written on the paper medium 200, and puts the text included in the second area 202a selected in a second color in a category that is visually distinguishable from that included in the first and second areas 201a and 203a. That is, it can be seen from FIG. 4B that the user wrote numerical symbols 1, 2, and 3 in order in a plurality of areas selected on the paper medium and the mobile terminal 100 classified the numerical symbols 1, 2, and 3 by color and aligned them to generate image information 301.

Moreover, the capturing unit 121 may sense the time when a line is added to a selected area by a writing motion on the paper medium. In addition, if the capturing unit 121 can further sense a change in the direction of the user's eyes, as well as a writing motion on the paper medium, it may sense the time when the user's eyes are fixed on the selected area.

As such, the controller 180 can adjust the projection size of image information and/or the size of text included in image information, based on the time when a line is added to the selected area and/or the time when the user's eyes are fixed on the selected area. That is, if the controller 180 decides that the user has paid special interest on the selected area, it may visually highlight the image information corresponding to the written specific symbol (e.g., increase of the projection size or the size of the text) and project it.

FIG. 5 is a conceptual diagram illustrating a method of projecting image information in a way that shows a highlighting effect on an area selected on the paper medium. A writing motion on a paper medium and a specific symbol written in an area selected by the writing motion are recognized by the capturing unit 121 placed on one side of the terminal 100. Also, the capturing unit 121 may recognize the width of the touch path drawn by the writing motion. The touch path may be drawn with a writing tool or with the user's hand.

If the width of the touch path recognized by the capturing unit 121 exceeds a preset reference value, the controller 180 can project image information in a way that shows an intended highlighting effect on the selected area. One example of the method to project image information in a way that shows a highlighting effect is to visually emphasize an area selected by touch by emitting light with no information. Another example of this method is to make an area selected by touch look emphasized more than others by emitting dark color light to the area where the touch path is not drawn. The mobile terminal 100 according to the embodiment of the present invention may be implemented in any of these methods.

For example, as shown in FIG. 5, if the user chooses to underline specific phrases 201, 202, and 203 with a thick pointed writing tool, for example, a highlighter while reading the paper medium, the mobile terminal 100 can recognize the width of the touch path of the writing tool and the locations of the selected areas 201, 202, and 203. The mobile terminal 100 decides that the width of the touch path in the selected areas 201, 202, and 203 exceeds a reference value, and projects a shadow on the areas 501, 502, 503, and 504 but not on the selected areas 201, 202, and 203, as illustrated in the drawing. As a result, the selected areas 201, 202, and 203 look highlighted.

Moreover, the controller 180 can project a highlight on the selected areas immediately after a touch path with a width exceeding a reference value is drawn or upon recognizing the completion of a touch. Additionally, image information is projected without writing a specific symbol for this case.

Figure 6:
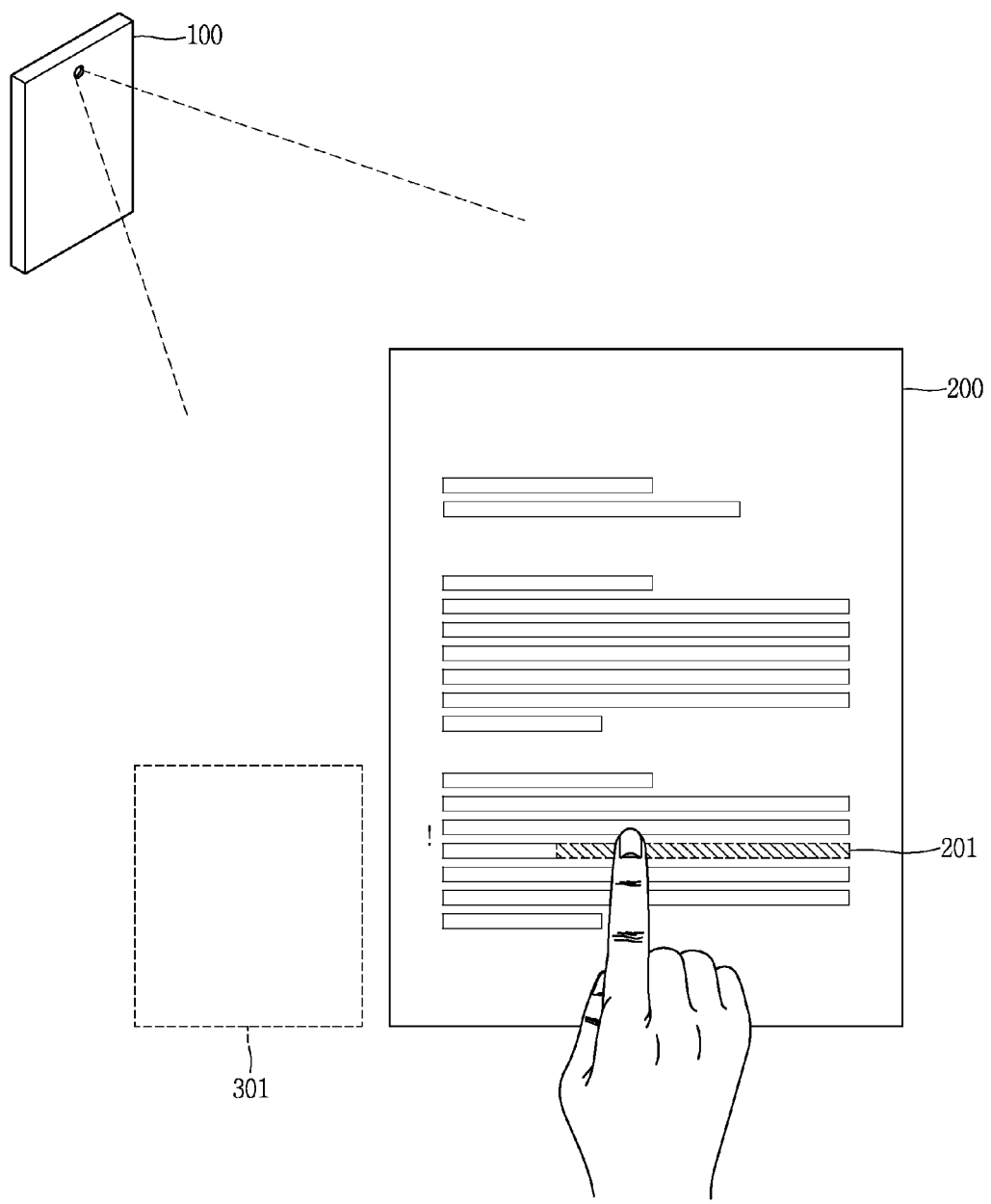
FIG. 6 is a conceptual diagram illustrating a method of deselecting an area on a paper medium according to an embodiment of the present invention.

FIG. 6 is a conceptual diagram illustrating a method of deselecting an area on a paper medium according to an embodiment of the present invention. When a writing motion is made on a paper medium and image information corresponding to the writing motion is projected, the capturing unit 121 may recognize a preset pattern of touch on a line drawn by the writing motion. The preset pattern of touch may be limited to a touch by the user (the shape, color, motion, etc. of a hand is recognized by the capturing unit 121). Also, the preset pattern of touch may be a zigzag touch on the drawn line.

Upon recognizing a preset pattern of touch, the controller 180 can deselect the area corresponding to the writing motion along the touch path. The controller 180 also may recognize that the entire selected area is deselected when a preset pattern of touch is made only at specific points (e.g., the start point and the end point) on the line.

For example, referring to FIG. 6, when a search result 301 for a selected area 201 is projected as a specific symbol, e.g., '!', written on the paper medium 200 is recognized, if the user is detected as making a zigzag touch by rubbing the selected area 201, it can be seen that the projection of the search result 301 for the selected area 201 is stopped even though the symbol '!' still remains.

If the user makes a gesture of covering the line drawn by the writing motion or a gesture of covering the written specific symbol, instead of making a zigzag touch, the controller 180 can find out that the line or the specific symbol is not recognized by the capturing unit 121 and stop projecting the corresponding image information. When the covered line and specific symbol are recognized again with the capturing unit 121 in response to a gesture, the projection of the image information may be resumed.

Figure 7:
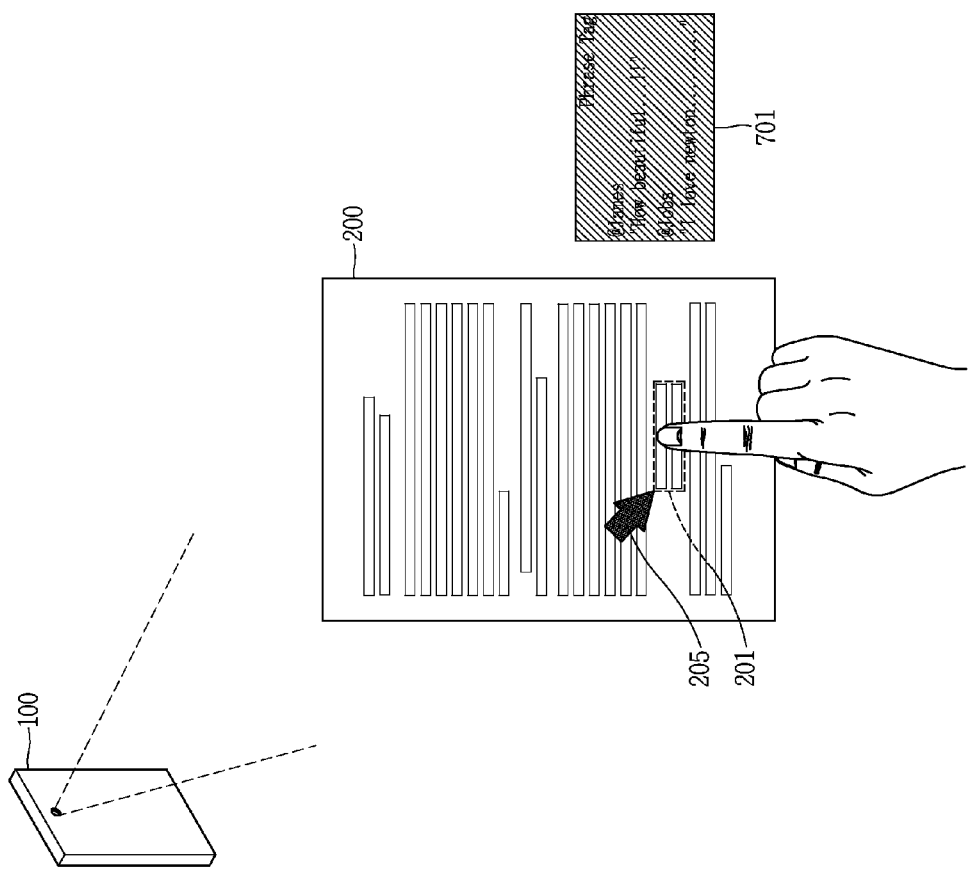
FIG. 7 is a conceptual diagram illustrating a method of projecting the execution result of a tagging function for a selected area on a paper medium according to an embodiment of the present invention.

Next, FIG. 7 is a conceptual diagram illustrating a method of projecting the execution result of a tagging function for a selected area on a paper medium according to an embodiment of the present invention. The capturing unit 121 placed on one side of the mobile terminal 100 according to the embodiment of the present invention recognizes a writing motion on a paper medium and the writing of a specific symbol in an area selected by the writing motion.

If the result of matching the specific symbol against symbols preset on the mobile terminal 100 shows that the control command corresponding to the written specific symbol is to execute a tagging function, the controller 180 hashes the context of a specific phrase the user selects in the area selected by the writing motion on the paper medium. Accordingly, a tag unique to the specific phrase selected by the user may be created.

Once such a tag is created, the controller 180 can get opinions and information from multiple users associated with the tagged specific phrase. Specifically, the controller 180 can receive information related to the specific phrase from a connected SNS server, in response to a touch that the capturing unit 121 senses on the area with the tagged specific phrase on it. Also, the controller 180 can process the received information to proper size and project it on the area associated with the location where the specific phrase is written.

For example, referring to FIG. 7, an icon 205 having a preset shape indicating the creation of a unique tag may be displayed next to an area with a tagged phrase. When the user touches the tagged phrase, the mobile terminal 100 receives opinions related to the tagged phrase from a connected SNS server and projects them next to the paper medium 200. If the paper medium is a page of a paper book with a lot of pages, unique tags created by writing specific symbols may be projected on a certain page because a tag for a specific phrase is a unique tag created by hashing the context.

The foregoing description has been made focusing on examples of image information corresponding to a specific symbol written on a paper medium. Hereinafter, concrete examples of the location, order, etc. of image information projected on a paper medium and corresponding to a selected area will be discussed.

Figure 8:
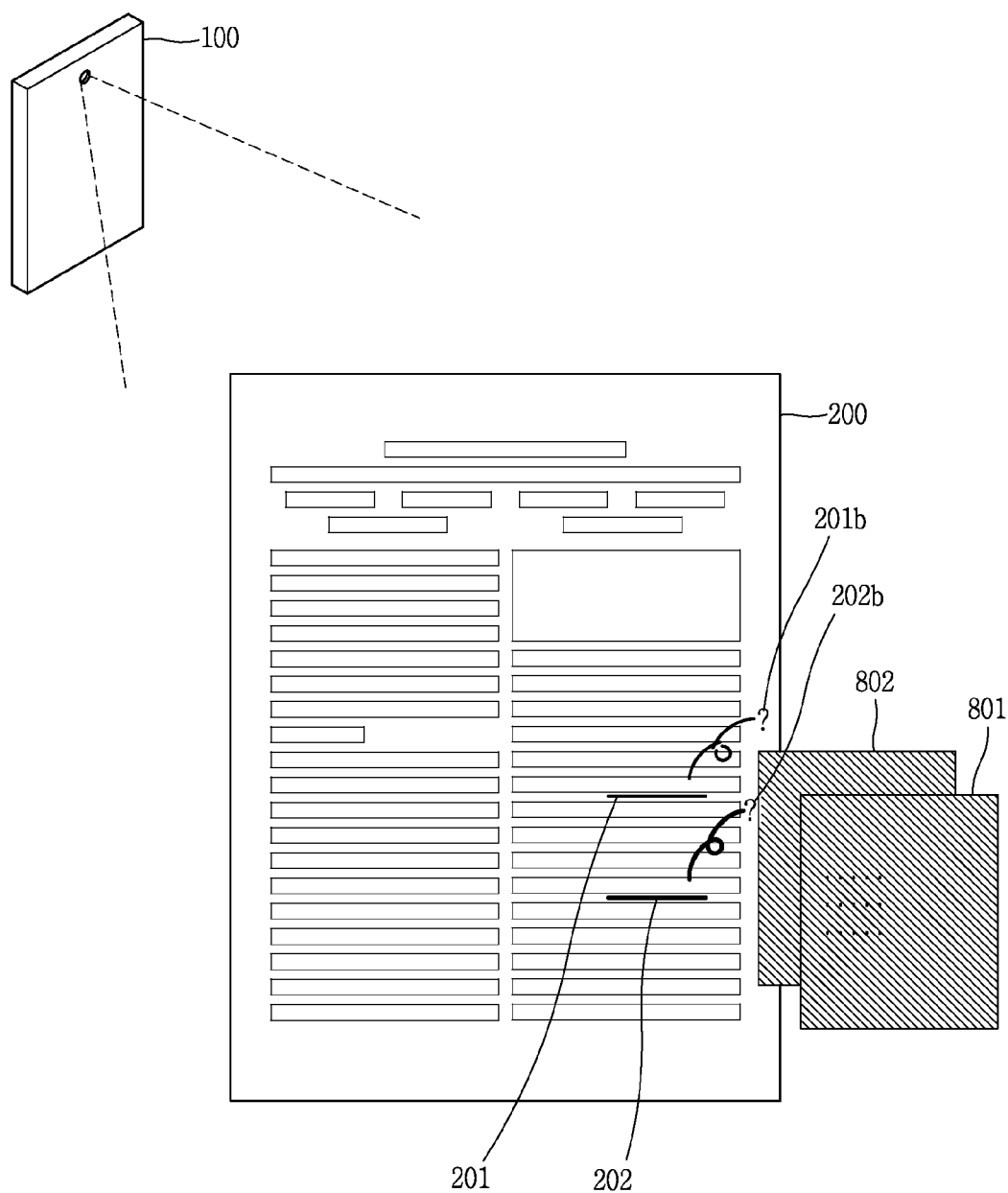
FIG. 8 is a conceptual diagram illustrating a method of determining the priority of projection of image information corresponding to a selected area on a paper medium according to an embodiment of the present invention.

FIG. 8 is a conceptual diagram illustrating a method of determining the priority of projection of image information corresponding to an area selected on a paper medium according to an embodiment of the present invention. The capturing unit 121 placed on one side of the mobile terminal 100 according to the embodiment of the present invention recognizes a writing motion on a paper medium and the writing of a specific symbol in an area selected by the writing motion. Also, the capturing unit 121 may recognize a touch path drawn on a paper medium by a writing motion. The controller 180 can determine the priority of projection of image information corresponding to the selected area, based on the recognized touch path.

More specifically, when projecting multiple image information on the same area, the controller 180 can recognize the width and color of a touch path drawn on a paper medium in order to determine the priority of projection of image information corresponding to an area selected on a paper medium. For example, if the touch path has a large width and/or is highlighted (e.g., in red or blue), the controller 180 can decide that the user finds the selected area important, and put a high priority on projecting image information.

That is, the controller 180 increases the priority of projection of image information as the width of the touch path increases. Also, if the multiple image information overlaps at least partially with each other, the controller 180 can project higher-priority image information on a higher level. In this instance, lower-priority image information projected on a lower level may be moved to an upper level by the user's making a gesture of turning over image information projected on an upper level.

For example, in FIG. 8, if the projection positions of image information corresponding to a plurality of selected areas 201 and 202 on the paper medium 200 overlap each other, the mobile terminal 100 determines the priority of projection of based on the width and color of a touch path drawn when an area is selected. Accordingly, it can be seen that even if image information 802 corresponding to the second area 202 is projected after image information 801 corresponding to the first area 201 is projected, not the image information 802 to be projected later but the image information 102 corresponding to the first area 201 having a higher priority of projection is projected on an upper level.

If the first area 201 and the second area 202 have the same priority or are difficult to tell which is which by their touch paths, the controller 180 enables image information corresponding to the later selected area to be projected over the image information corresponding to the earlier selected area.

Figure 9A:
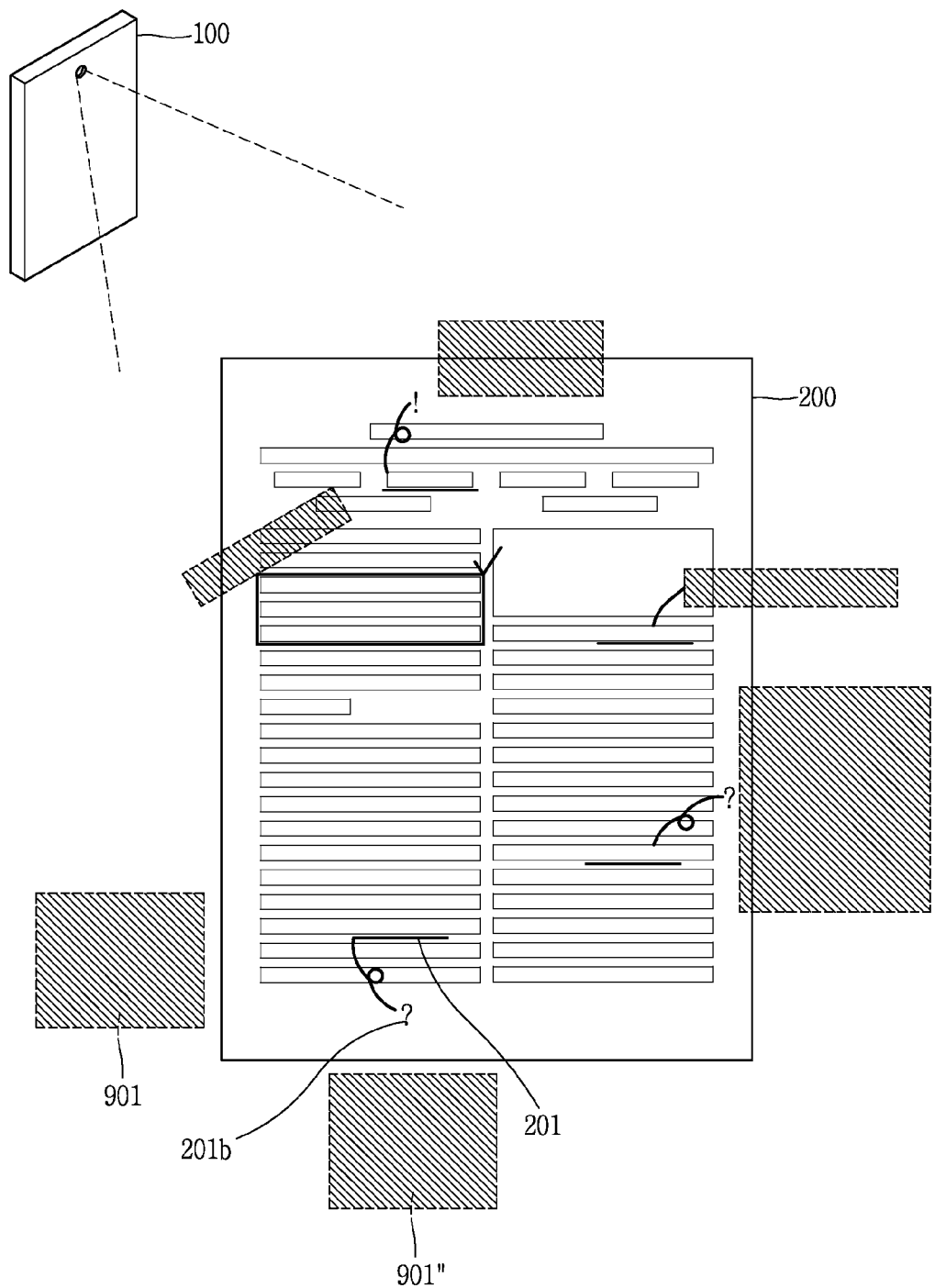
FIGS. 9A to 9C are conceptual diagrams illustrating a method of determining and changing the projection position of image information corresponding to an area selected on a paper medium according to an embodiment of the present invention.
Figure 9B:
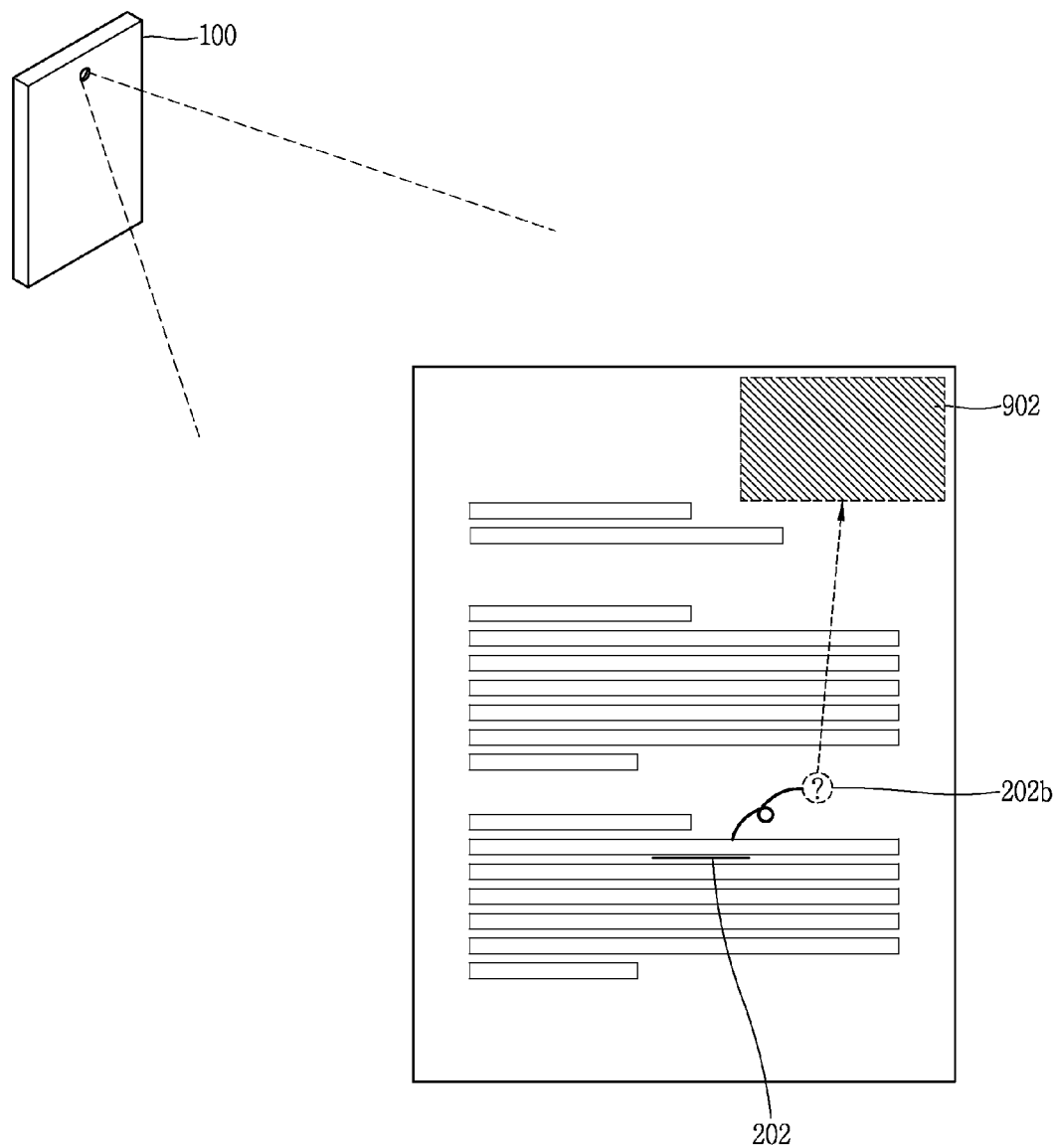
Figure 9C:
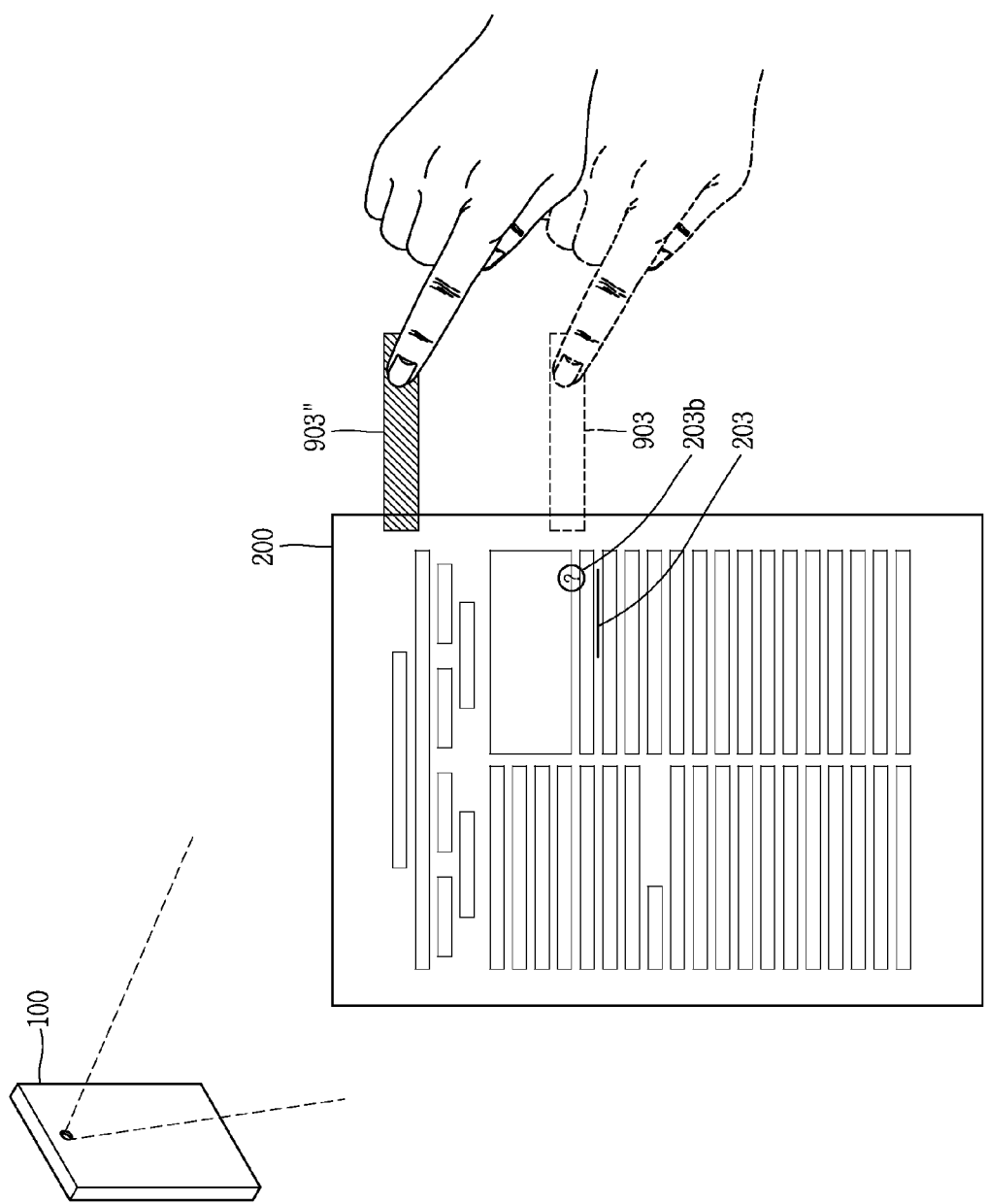

FIGS. 9A to 9C are conceptual diagrams illustrating a method of determining and changing the projection position of image information corresponding to an area selected on a paper medium according to an embodiment of the present invention.

The mobile terminal 100 according to the embodiment of the present invention recognizes a specific symbol written on a paper medium, and projects the execution result of a control command for the specific symbol on the area with the specific symbol written on it. More specifically, the controller 180 enables image information corresponding to the execution result of the control command to be projected on the outside of the selected area next to the specific symbol.

In another embodiment, in order to ensure the visibility of other text written on the paper medium, the controller 180 can project image information corresponding to the execution result of the control command on an area closest to the specific symbol on the outside of the paper medium. That is, the image information projected from the mobile terminal 100 is projected on the outside of the paper medium within the angle of view of the capturing unit 121.

For example, as shown in FIG. 9A, image information projected through the mobile terminal 100 may be projected on the area closest to the corresponding specific symbol 201*b*, that is, either the first area 901 or the second area 901". In this instance, the mobile terminal also may project only guide frames on the first area 901 and the second area 901" and output the image information on any touched guide frame.

Moreover, the controller 180 can recognize empty space on the paper medium where text, writings, or specific symbols are not written by using the capturing unit 121. Then, the controller 180 can control the projector 155 to project image information corresponding to the execution result of a control command on the recognized empty space.

For example, as shown in FIG. 9B, the image information 902 projected through the mobile terminal 100 may be projected on an empty space spaced apart from the specific symbol 202*b*. Accordingly, the projected image information 902 is kept from blocking the text written on the paper medium 200 and therefore does not obstruct the user from reading.

The user may change the projection position of image information to an area they want. Specifically, upon sensing a drag on a touch on one area where image information is projected, the controller 180 can control the projector 155 so that the projection position of the image information moves along the drag.

For example, as shown in FIG. 9C, it can be seen that the image information 903 projected through the mobile terminal 100 has been moved to a position 903" in response to a drag touch input from the user. The image information projected on the paper medium may be processed into such a form that the user can easily distinguish from others and then projected, depending on the color of the paper medium, the background color of the area around the paper medium, and the illumination of the surroundings, etc. Thus, the capturing unit 121 of the mobile terminal 100 according to the embodiment of the present invention may collect environmental information, such as the color of the paper medium, the background color of the area around the paper medium, and the illumination of the surroundings and provide it to the controller 180.

Figure 10:
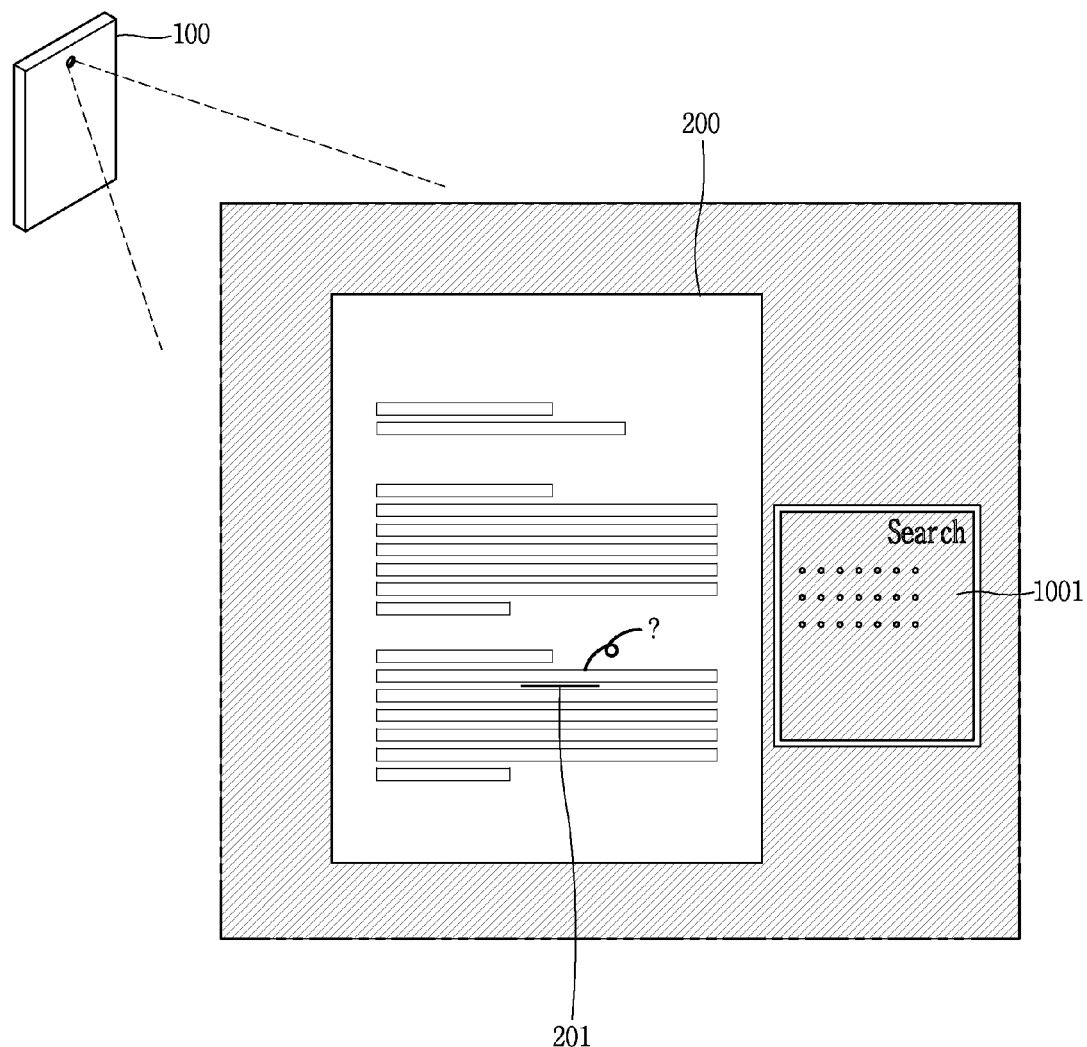
FIG. 10 is a conceptual diagram illustrating a method of determining the color of image information corresponding to a selected area based on the background color of a projection position according to an embodiment of the present invention.

FIG. 10 is a conceptual diagram illustrating a method of determining the color of image information corresponding to a selected area based on the background color of a projection position according to an embodiment of the present invention. The capturing unit 121 placed on one side of the mobile terminal 100 according to the embodiment of the present invention recognizes a writing motion on a paper medium and the writing of a specific symbol in an area selected by the writing motion. Also, the controller 180 can recognize the background color of an area where image information corresponding to the execution result is to be projected (the color of the paper medium or the background color of the area around the paper medium) by using the capturing unit 121.

Once the background color of an image information projection area is recognized, the controller 180 can select a color which is visually distinct from the background color of the image information projection area, and then project image information. For example, as shown in FIG. 10, the background color of a projection area is checked first when projecting image information corresponding to a specific symbol written on the paper medium through the mobile terminal 100.

If the background color of the projection area is 'black', the image information is projected after changing the color of the text included in the image information to 'white', which is quite distinct from 'black'. If the background color of the projection area is changed to 'white' because this area is blocked by other objects or the like, the mobile terminal 100 may project the image information after detecting a change in background color by using the capturing unit 121 and changing the color of the text included in the image information to 'black', which is quite distinct from the new background color.

Figure 11:
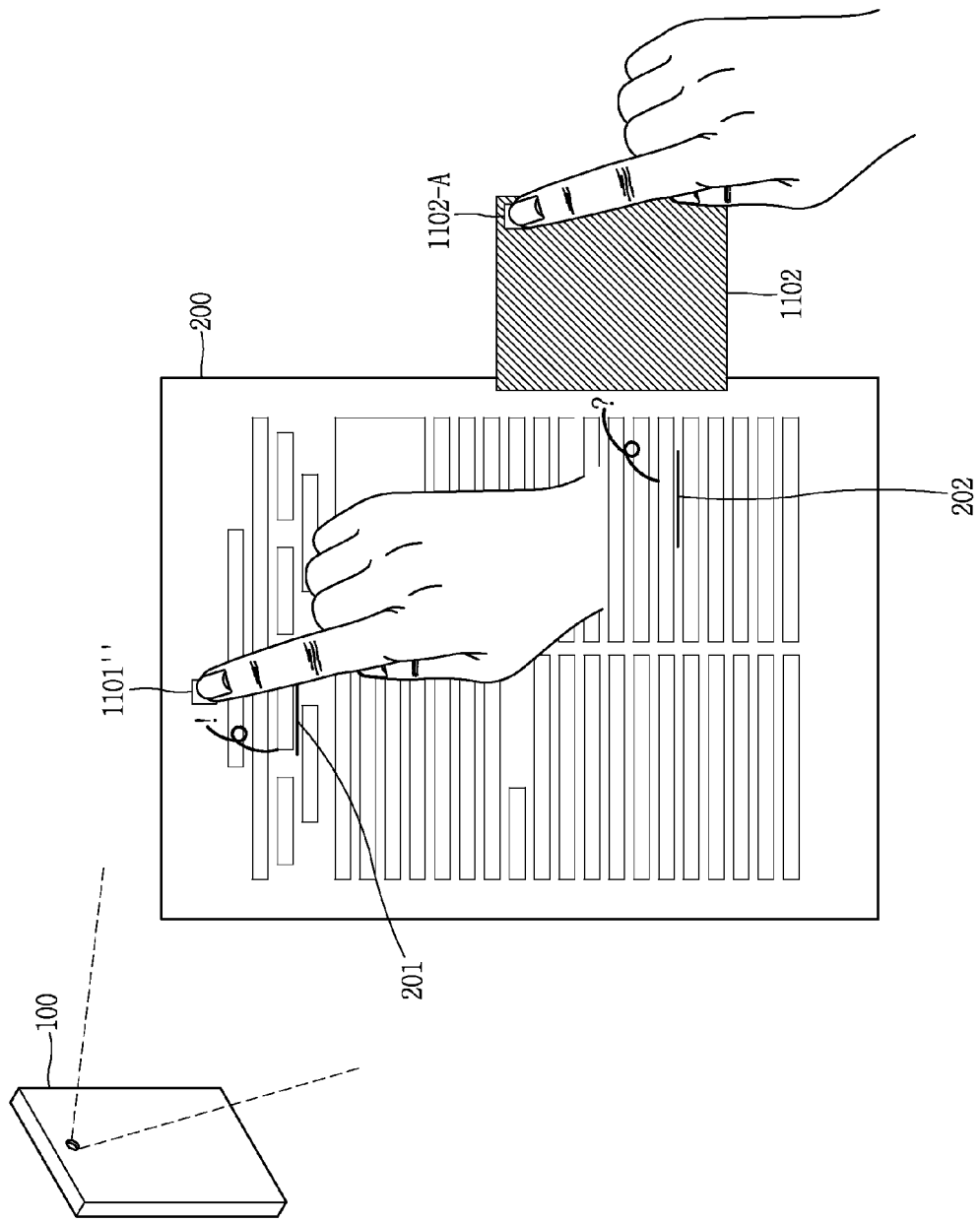
FIG. 11 is a conceptual diagram illustrating a method of changing the projection range of image information corresponding to a selected area according to an embodiment of the present invention.

FIG. 11 is a conceptual diagram illustrating a method of changing the projection range of image information corresponding to a selected area according to an embodiment of the present invention. Thus, a dog-ear icon may be displayed in one area of the image information projected through the mobile terminal 100. A dog-ear is a phrase referring to the folded down corner of a book. The dog-ear icon has no limitation in shape. For example, as shown in FIG. 11, the dog-ear icon 1102_A may be in the shape of a rectangular box.

Upon sensing a touch on the dog-ear icon through the capturing unit 121, the controller 180 can reduce the projection range of image information to a preset level, e.g., to the size of the dog-ear icon. For example, when the user does a short touch on the dog-ear icon 1102_A displayed on the projected image information 1102, as shown in FIG. 11, only the dog-ear icon 1102_A is projected on the corresponding area 110, as displayed 1101" in the top of the paper medium. When the user touches the dog-ear icon 1101" again, the image information including the dog-ear icon 1102_A is projected again on the corresponding area 1101", as displayed 1102 on the side of the paper medium.

Upon sensing a pinch-in or pinch-out touch on the projected image information, the controller 180 can project the image information after reducing or enlarging the size of the image information in proportion to the size of the touch. Further, the paper medium can include multiple pages according to an embodiment of the present invention. In this instance, image information corresponding to a written specific symbol needs to be stored for each page.

Figure 12:
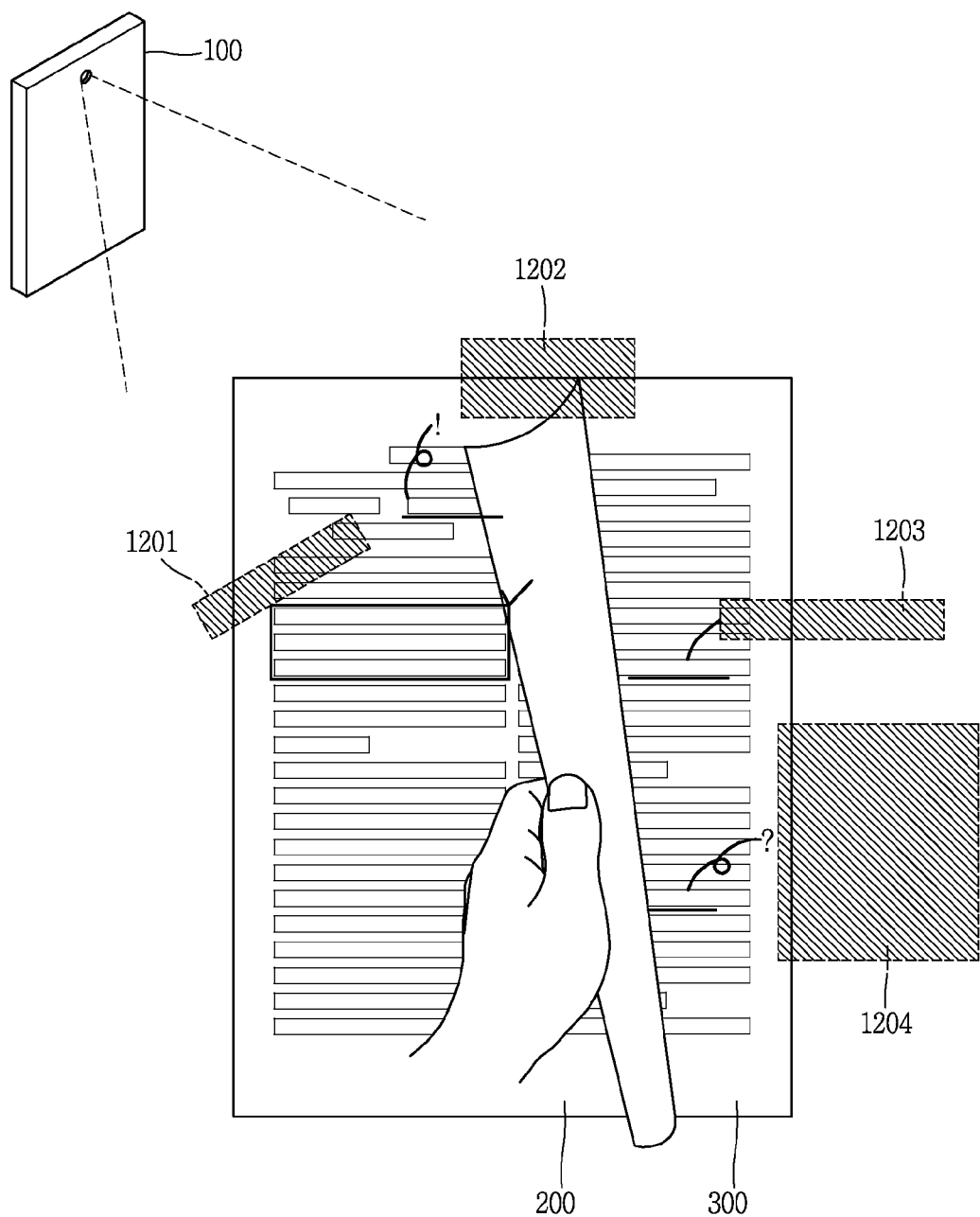
FIG. 12 is a conceptual diagram illustrating a method of storing image information corresponding to a selected area when turning over a page according to an embodiment of the present invention.

Regarding this, FIG. 12 is a conceptual diagram illustrating a method of storing image information corresponding to a selected area when turning over a page according to an embodiment of the present invention. The capturing unit 121 placed on one side of the mobile terminal 100 according to the embodiment of the present invention recognizes a writing motion on a paper medium and the writing of a specific symbol in an area selected by the writing motion, and project the corresponding image information on the paper medium.

Upon recognizing, through the capturing unit 121, that a page of the paper medium is turned over, the controller 180 stores the projection position of the image information relative to the selected area on the paper medium and the content contained in the projected image information in the memory 160. Then, the controller 1890 initializes the projection as a page is turned over.

For example, upon recognizing a user gesture of turning over a page and detecting a new page through the mobile terminal 100, as shown in FIG. 12, the image information 1201, 1202, 1203, and 1204 projected on the previous page 200 disappear, and the positions of this image information and the content contained in it, as well as the page 200, are stored in the memory 160.

Moreover, upon sensing the presence of any previously written specific symbol from a new page that appears after turning over a page of the paper medium, by using the capturing unit 121, the controller 180 can detect image information corresponding to the page with this specific symbol on it from the memory 160 and project the detected image information immediately on the area with the specific symbol written on it. The image information projected on the previous and subsequent pages may be combined into a single piece of image information and projected on each page by writing a preset specific symbol on a specific page.

Therefore, the mobile terminal and the method of controlling the same according to at least one of the embodiments of the present invention provide an interface environment where it can interact with a paper medium by recognizing a user's writing on the paper medium and presenting writing-related information on the paper medium. Also, writing-related information can be made look realistic as if actually written on the paper medium by projecting image information related to a writing on the paper medium on a user-desired area and storing the projection position. Accordingly, the user can focus on the paper medium without having to look alternately at the paper medium and the mobile terminal to use various functions implemented on the mobile terminal.

Various embodiments may be implemented using a machine-readable medium having instructions stored thereon for execution by a processor to perform various methods presented herein. Examples of possible machine-readable mediums include ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely and are not to be considered as limiting the present invention. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
    a projector configured to project an image;
    a capturing unit configured to recognize a writing motion on a paper medium including at least one text and a writing of a specific symbol associated with an area selected by the writing motion; and
    a controller configured to:
        control the capturing unit to recognize a location of the selected area and text included in the selected area,
        control the projector to project a highlighting line in the area selected by the writing motion,
        apply a function corresponding to the specific symbol to the text included in the selected area if the specific symbol matches a preset symbol,
        control the projector to project an image of information corresponding to a result of the execution of the function on an area determined based on a position information related to the writing of the specific symbol while recognizing the writing of the specific symbol,
        control the projector to stop projection of the image of the information and the highlighting line if a predetermined touch gesture is applied to the selected area while maintaining the writing of the specific symbol, and
        control the projector to resume projection of the image of the information if the highlighting line is recognized according to a continuous touch gesture while maintaining the writing of the specific symbol.

2. The mobile terminal of claim 1, wherein if the function corresponding to the specific symbol is to execute a search function, the controller is further configured to execute a search function using the recognized text as a keyword and project result an image of information corresponding to the search.

3. The mobile terminal of claim 1, wherein if the function corresponding to the specific symbol is to execute an alignment function, the controller is further configured to align the text included in the selected area in order of a number corresponding to the specific symbol and project the image of information corresponding to the aligned text.

4. The mobile terminal of claim 3, wherein the capturing unit is further configured to recognize a color produced by a writing tool used to make the writing motion, and
    wherein the controller is further configured to align the text included in the selected area by color according to the ordinal number of the specific symbol, based on the recognized color of the writing tool, and project the image of information corresponding to the aligned text.

5. The mobile terminal of claim 1, wherein the capturing unit is further configured to recognize a preset pattern of touch on a line drawn by the writing motion, and upon recognizing the preset pattern of touch, the controller is further configured to deselect the area corresponding to the writing motion along the touch path.

6. The mobile terminal of claim 1, wherein if the function corresponding to the specific symbol is to execute a tagging function, the controller is further configured to hash a context of a specific phrase in the area selected by the writing motion and create a tag unique to the specific phrase.

7. The mobile terminal of claim 6, wherein the controller is further configured to receive information related to the specific phrase from a connected SNS server, in response to a touch on the area with the tagged specific phrase thereon, and project the received information on the area associated with the location where the specific phrase is written.

8. The mobile terminal of claim 1, wherein the capturing unit is further configured to recognize a touch path drawn on the paper medium by the writing motion and determine a priority of projection of the image of the information corresponding to the selected area based on the recognized touch path.

9. The mobile terminal of claim 8, wherein the controller is further configured to:

increase the priority of projection of the image of the information as the width of the touch path increases, and if multiple images of the information overlap at least partially with each other, project higher-priority the image of the information on a higher level.

10. The mobile terminal of claim 1, wherein the controller is further configured to project image information corresponding to the execution result on an outside of the selected area next to the specific symbol.

11. The mobile terminal of claim 1, wherein the controller is further configured to recognize an empty space on the paper medium where text, writing, or specific symbols are not written by, and control the projector to project the image of information corresponding to the execution result on the empty space if at least a portion of the text included in the selected area is included in the area determined based on the position information related to the writing of the specific symbol.

12. The mobile terminal of claim 1, wherein the controller is further configured to recognize a background color of an area where the image of the information corresponding to the execution result is to be projected, and control the projector to project the image of the information in a color which is visually distinct from the background color.

13. The mobile terminal of claim 1, wherein the controller is further configured to:
display a dog-ear icon in one area of the image of the information, and
reduce a projection range of an image of information to a preset level, in response to a touch on the dog-ear icon.

14. The mobile terminal of claim 1, wherein, in response to a touch and drag input on one area where the image of the information is projected, the controller is further configured to control the projector so that a projection position of the image of the information moves along the touch and drag input.

15. The mobile terminal of claim 1, wherein the controller is further configured to:
recognize that a page of the paper medium is turned over, and
store a projection position of the image of the information relative to the selected area on the paper medium and the content contained in the projected image of the information in the memory and then initialize the projection.

16. The mobile terminal of claim 15, wherein upon sensing a presence of the specific symbol from a newly turned page, the controller is further configured to detect image of information corresponding to the page with the specific symbol thereon from the memory and project the detected image of the information immediately on the area with the written specific symbol.

17. The mobile terminal of claim 1, wherein if the specific symbol and the preset symbol fail to match each other, the controller is further configured to control the projector to project a message indicating a matching failure on the area with the written specific symbol.

18. A method of controlling a mobile terminal, the method comprising:
recognizing, via a capturing unit of the mobile terminal, a writing motion on a paper medium including at least one text and a writing of a specific symbol in an area selected by the writing motion;
recognizing, via the capturing unit, a location of the selected area and text included in the selected area;
projecting, via a projector of the mobile terminal, a highlighting line in the area selected by the writing motion,
applying, via a controller of the mobile terminal, a function corresponding to the specific symbol to the text included in the selected area if the specific symbol matches a preset symbol;
projecting, via the projector, an image of information corresponding to a result of the execution of the function on an area determined based on a position information related to the writing of the specific symbol while recognizing the writing of the specific symbol;
stopping, via the controller, projection of the image of the information and the highlighting line if a predetermined touch gesture is applied to the selected area while maintaining the writing of the specific symbol; and
resuming, via the controller, projection of the image of the information if the highlighting line is recognized according to a continuous touch gesture while maintaining the writing of the specific symbol.

\* \* \* \* \*